United States Patent
Apthorp et al.

(10) Patent No.: US 11,392,272 B2
(45) Date of Patent: Jul. 19, 2022

(54) GROUP-BASED COMMUNICATION SYSTEM AND APPARATUS CONFIGURED TO RENDER SUGGESTED GRAPHICAL OBJECTS

(71) Applicant: Slack Technologies, LLC, San Francisco, CA (US)

(72) Inventors: Jeremy Apthorp, San Francisco, CA (US); Devin Foley, San Francisco, CA (US); Matthew Crocker, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 16/938,542

(22) Filed: Jul. 24, 2020

(65) Prior Publication Data

US 2021/0026504 A1   Jan. 28, 2021

Related U.S. Application Data

(60) Provisional application No. 62/879,120, filed on Jul. 26, 2019.

(51) Int. Cl.
*G06F 40/205* (2020.01)
*G06F 3/048* (2013.01)
(Continued)

(52) U.S. Cl.
CPC .......... *G06F 3/0482* (2013.01); *G06F 16/538* (2019.01); *G06F 40/205* (2020.01); *G06N 20/00* (2019.01); *H04L 12/1813* (2013.01)

(58) Field of Classification Search
CPC ... H04L 51/02; H04L 12/1813; G06F 3/0482; G06F 16/538; G06F 40/205; G06N 20/00
See application file for complete search history.

(56) References Cited

U.S. PATENT DOCUMENTS 10,871,877 B1 * 12/2020 Clediere ................ G06Q 50/01
11,012,445 B1 *  5/2021 Jamison ................ H04W 12/76
(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516. (dated Aug. 14, 2013, 4:15 PM) 2 pages.
(Continued)

*Primary Examiner* — Scott T Baderman
*Assistant Examiner* — Mario M Velez-Lopez
(74) *Attorney, Agent, or Firm* — Holland & Hart LLP

(57) ABSTRACT

Various embodiments of the present invention are directed to an improved group-based communication apparatus that is configured to render suggested graphical objects within a group-based communication interface. The group-based communication apparatus is configured to determine a ranking for a group-defined graphical object set based a user identifier. In response to receiving graphical object interface requests or messaging communication provision requests, the group-based apparatus is configured to determine at least one suggested graphical object based on the ranking and cause rendering of the at least one graphical object to a graphical object selection interface.

20 Claims, 16 Drawing Sheets

(51) Int. Cl.
  *H04L 12/18*   (2006.01)
  *G06F 3/0482*  (2013.01)
  *G06N 20/00*   (2019.01)
  *G06F 16/538*  (2019.01)

(56) References Cited

U.S. PATENT DOCUMENTS

| | | | | |
|---|---|---|---|---|
| 11,271,878 | B2* | 3/2022 | Christian | H04L 12/1818 |
| 2013/0103766 | A1* | 4/2013 | Gupta | G06Q 10/101 |
| | | | | 709/206 |
| 2017/0118154 | A1* | 4/2017 | Venkatakrishnan | ............ |
| | | | | H04L 63/105 |
| 2017/0147185 | A1* | 5/2017 | Milvaney | G06F 40/169 |
| 2018/0255009 | A1* | 9/2018 | Chen | H04L 51/32 |
| 2018/0287982 | A1 | 10/2018 | Draeger et al. | |
| 2018/0367483 | A1* | 12/2018 | Rodriguez | H04L 65/60 |
| 2019/0007352 | A1* | 1/2019 | Doh | H04L 51/046 |
| 2019/0056841 | A1* | 2/2019 | Fernandez | G06F 3/04817 |
| 2021/0173493 | A1* | 6/2021 | Barzilay | H04L 51/16 |

OTHER PUBLICATIONS

"How Slack changed the way we work by putting the customer experience first", Repeat Customer Podcast, Episode 3, [online][retrieved May 9, 2019]. Retrieved from the Internet: URL: https://www.zendesk.com/resources/slack-customer-experience/, (2019) 13 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: URL: https://slate.com/business/2014/05/stewart-butterfield-flickr-and-slack-how-he-snatched-victory-from-the-jaws-of-defeat.html (dated May 28, 2014, 2:48 PM) 8 pages.
Ernie Smith, "Picking Up The Slack", Tedium, [online][retrieved May 9, 2019]. Retrieved from the Internet: URL https://tedium.co/2017/10/17/irc-vs-slack-chat-history/ (dated Oct. 17, 2017) 13 pages.
Internet Relay Chat, Wikipedia, [online][retrieved May 30, 2019]. Retrieved from the Internet: URL: https://en.wikipedia.org/wiki/Internet_Relay_Chat. (dated May 28, 2019) 20 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications—", Fujitsu Sci. Tech. J., 36, 2, (Dec. 2000) 154-161.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Isaac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516. (dated Oct. 31, 2014) 2 pages.
Oikarinen, J. & Reed, D., "Internet Relay Chat Protocol", Request for Comments: 1459, Network Working Group, [online][retrieved May 30, 2019], Retrieved from the Internet: URL: https://www.rfc-editor.org/rfc/rfc1459.txt. (dated May 1993) 57 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019]. Retrieved from the Internet: URL: https://www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

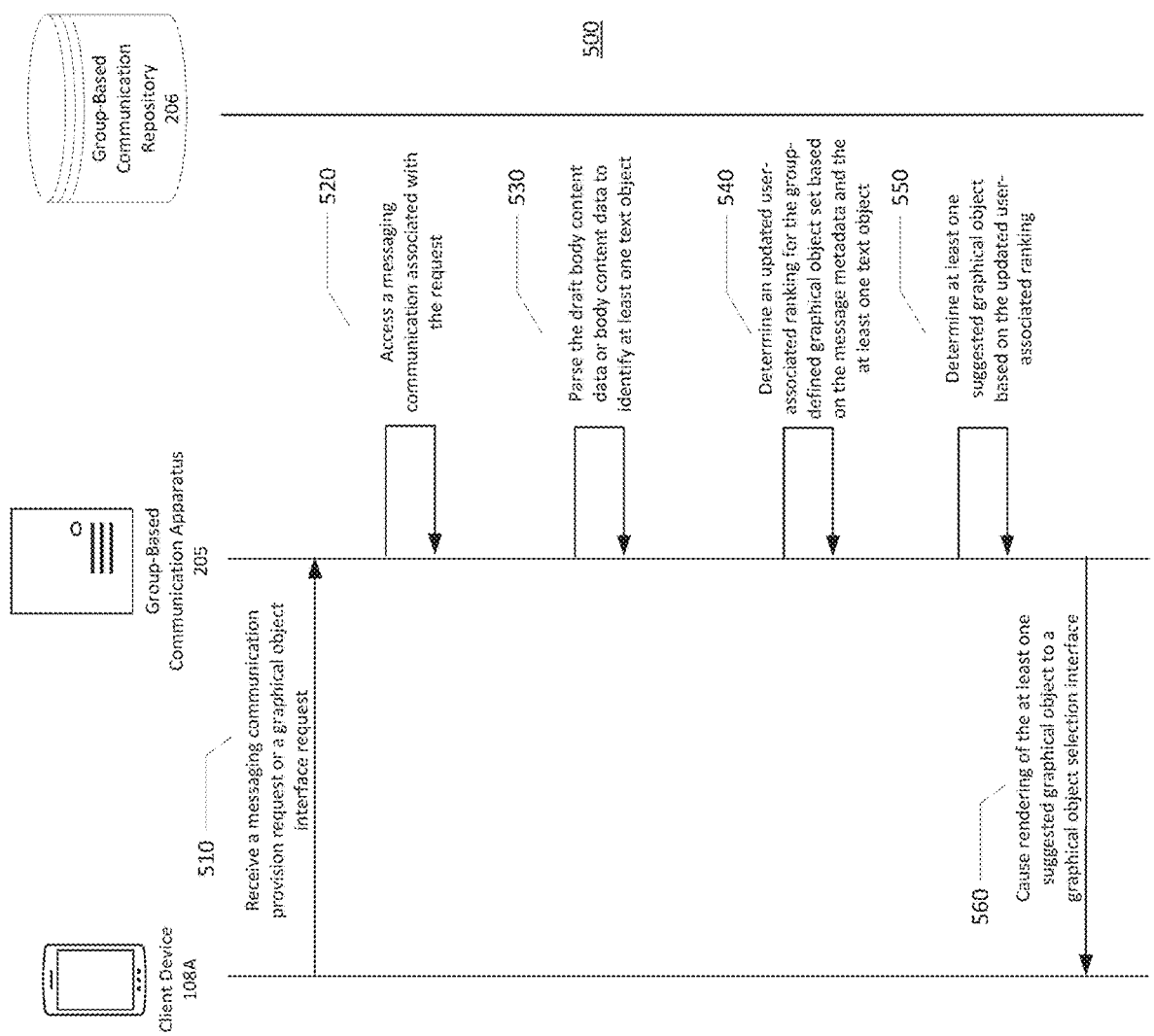

GROUP-BASED COMMUNICATION SYSTEM AND APPARATUS CONFIGURED TO RENDER SUGGESTED GRAPHICAL OBJECTS

CROSS-REFERENCE TO RELATED APPLICATIONS

This application claims the priority of U.S. Provisional Application No. 62/879,120, filed Jul. 26, 2019, the entire contents of which are incorporated herein by reference.

BACKGROUND

There are a number of deficiencies and problems associated with existing methods, apparatus, and systems related to interaction with communication systems. For example, when drafting a messaging communication, a user may desire to include one or more graphical objects (e.g., emojis, emoticons, and/or the like) in a messaging communication. Additionally, or alternatively, when viewing messaging communications posted by other users, a user may desire to respond, or react, to a messaging communication by using one or more graphical objects.

However, these users may experience frustration when attempting to select their respective graphical object for use. For example, a graphical object selection interface may list a large number of graphical objects in a predefined order, a majority of which may be irrelevant to the user and/or to the messaging communication. Thus, the user may be forced to scroll, search, or otherwise take time to navigate through the provided list to locate a desired graphical object. Further, while the user may desire to select a graphical object, it may be unclear to the user exactly which graphical object would be most appropriate to associate with the messaging communication or to display to other users. Thus, a plurality of graphical objects provided may not be meaningful to a given user and not suggestive of one or more other users nor of one or more messaging communications posted. Further, rendering an entire plurality of graphical objects in a user interface may be too computationally intense for certain client devices.

BRIEF SUMMARY

Various embodiments of the present invention are directed to an improved group-based communication apparatus that is configured to output suggested graphical objects to a group-based communication interface of a group-based communication platform. The group-based communication apparatus is configured to determine a user-associated ranking for a group-defined graphical object set based on user graphical object data. In response to receiving graphical object interface requests or messaging communication provision requests, the group-based apparatus is configured to determine at least one suggested graphical object based on the user-associated ranking and cause rendering of the at least one graphical object to a graphical object selection interface as discussed in detail herein.

One embodiment is directed to a group-based communication apparatus configured to output suggested graphical objects to a group-based communication interface of a group-based communication platform, the group-based communication apparatus comprising at least one processor and at least one non-transitory memory including program code, the at least one non-transitory memory and the program code configured to, with the processor, cause the apparatus to at least receive a user identifier and a group identifier; access a group-defined graphical object set based on the group identifier; access user graphical object data associated with the user identifier; determine a user-associated ranking for the group-defined graphical object set based on the user graphical object data; receive a graphical object interface request; and in response to receiving the graphical object interface request, determine at least one suggested graphical object based on the user-associated ranking and cause rendering of the at least one suggested graphical object to a graphical object selection interface.

In one embodiment, the group-based communication apparatus is further configured to access a messaging communication associated with the graphical object interface request, the messaging communication comprising message metadata and body content data; parse the body content data to identify at least one text object; determine an updated user-associated ranking for the group-defined graphical object set based on the message metadata and the at least one text object; and determine at least one suggested graphical object based on the updated user-associated ranking and cause rendering of the at least one suggested graphical object to the graphical object selection interface. In another embodiment, the group-based communication apparatus is further configured to parse the body content data to identify at least one text object, wherein the at least one text object is associated with a second user identifier; and determine an updated user-associated ranking for the group-defined graphical object set based on the message metadata, the at least one text object, and the second user identifier. In some embodiments, the group-based communication apparatus is further configured to determine a topic-defined graphical object set by comparing the at least one text object to a keyword set of each graphical object of the group-defined graphical object set; and determine an updated user-associated ranking for the group-defined graphical object set based on the message metadata and the topic-defined graphical object set.

In some embodiments, determining the user-associated ranking for the group-defined graphical object set based on the user graphical object data comprises determining a graphical object score for each graphical object in the group-defined graphical object set. In some embodiments, the graphical object score is at least based on a use frequency score associated with the respective graphical object. In some embodiments, the graphical object score is at least based on a user-preferred score associated with the respective graphical object. In some embodiments, the group-based communication apparatus is further configured to access a role identifier associated with the user identifier; and determine the user-associated ranking for the group-defined graphical object set based on the user graphical object data and the role identifier.

In accordance with another aspect, a computer-implemented method for outputting suggested graphical objects to a group-based communication interface of a group-based communication platform is provided. The computer-implemented method comprises receiving a user identifier and a group identifier; accessing a group-defined graphical object set based on the group identifier; accessing user graphical object data associated with the user identifier; determining a user-associated ranking for the group-defined graphical object set based on the user graphical object data; receiving a graphical object interface request; and in response to receiving the graphical object interface request, determining at least one suggested graphical object based on the user-associated ranking and cause rendering of the at least one suggested graphical object to a graphical object selection interface.

In one embodiment, the computer-implemented method further comprises accessing a messaging communication associated with the graphical object interface request, the messaging communication comprising message metadata and body content data; parsing the body content data to identify at least one text object; determining an updated user-associated ranking for the group-defined graphical object set based on the message metadata and the at least one text object; and determining at least one suggested graphical object based on the updated user-associated ranking and causing rendering of the at least one suggested graphical object to the graphical object selection interface.

In another embodiment, the computer-implemented method further comprises parsing the body content data to identify at least one text object, wherein the at least one text object is associated with a second user identifier; and determining an updated user-associated ranking for the group-defined graphical object set based on the message metadata, the at least one text object, and the second user identifier. In some embodiments, the computer-implemented method further comprises determining a topic-defined graphical object set by comparing the at least one text object to a keyword set of each graphical object of the group-defined graphical object set; and determining an updated user-associated ranking for the group-defined graphical object set based on the message metadata and the topic-defined graphical object set.

In some embodiments, determining the user-associated ranking for the group-defined graphical object set based on the user graphical object data comprises determining a graphical object score for each graphical object in the group-defined graphical object set. In some embodiments, the graphical object score is at least based on a use frequency score associated with the respective graphical object. In some embodiments, the graphical object score is at least based on a user-preferred score associated with the respective graphical object. In some embodiments, the computer-implemented method further comprises accessing a role identifier associated with the user identifier; and determining the user-associated ranking for the group-defined graphical object set based on the user graphical object data and the role identifier.

In accordance with another aspect, a computer program product is provided. The computer program product comprises at least one non-transitory computer-readable storage medium having computer-readable program code portions stored therein. The computer-readable program code portions comprising an executable portion configured to receive a user identifier and a group identifier; access a group-defined graphical object set based on the group identifier; access user graphical object data associated with the user identifier; determine a user-associated ranking for the group-defined graphical object set based on the user graphical object data; receive a graphical object interface request; and in response to receiving the graphical object interface request, determine at least one suggested graphical object based on the user-associated ranking and cause rendering of the at least one suggested graphical object to a graphical object selection interface.

In one embodiment, the computer-readable program code portions comprise an executable portion further configured to access a messaging communication associated with the graphical object interface request, the messaging communication comprising message metadata and body content data; parse the body content data to identify at least one text object; determine an updated user-associated ranking for the group-defined graphical object set based on the message metadata and the at least one text object; and determine at least one suggested graphical object based on the updated user-associated ranking and cause rendering of the at least one suggested graphical object to the graphical object selection interface. In another embodiment, the computer-readable program code portions comprise an executable portion further configured to parse the body content data to identify at least one text object, wherein the at least one text object is associated with a second user identifier; and determine an updated user-associated ranking for the group-defined graphical object set based on the message metadata, the at least one text object, and the second user identifier. In some embodiments, the computer-readable program code portions comprise an executable portion further configured to determine a topic-defined graphical object set by comparing the at least one text object to a keyword set of each graphical object of the group-defined graphical object set; and determine an updated user-associated ranking for the group-defined graphical object set based on the message metadata and the topic-defined graphical object set.

In some embodiments, determining the user-associated ranking for the group-defined graphical object set based on the user graphical object data comprises determining a graphical object score for each graphical object in the group-defined graphical object set. In some embodiments, the graphical object score is at least based on a use frequency associated with the respective graphical object. In some embodiments, the graphical object score is at least based on a user-preferred score associated with the respective graphical object. In some embodiments, the computer-readable program code portions comprise an executable portion further configured to access a role identifier associated with the user identifier; and determine the user-associated ranking for the group-defined graphical object set based on the user graphical object data and the role identifier.

Another embodiment is directed to a group-based communication apparatus configured to output suggested graphical objects to a group-based communication interface of a group-based communication platform, the group-based communication apparatus comprising at least one processor and at least one non-transitory memory including program code, the at least one non-transitory memory and the program code configured to, with the processor, cause the apparatus to at least receive a user identifier and a group identifier; access a group-defined graphical object set based on the group identifier; access user graphical object data associated with the user identifier; determine a user-associated ranking for the group-defined graphical object set based on the user graphical object data; receive a messaging communication provision request; and in response to receiving the messaging communication provision request, determine at least one suggested graphical object based on the user-associated ranking and cause rendering of the at least one suggested graphical object to a graphical object selection interface.

In one embodiment, the group-based communication apparatus is further configured to access a draft messaging communication associated with the messaging communication provision request, the draft messaging communication comprising message metadata and draft body content data; parse the draft body content data to identify at least one text object; determine an updated user-associated ranking for the group-defined graphical object set based on the message metadata and the at least one text object; and determine at least one suggested graphical object based on the updated user-associated ranking and cause rendering of the at least one suggested graphical object to the graphical object selection interface. In another embodiment, the group-based communication apparatus is further configured to parse the draft body content data to identify at least one text object, wherein the at least one text object is associated with a second user identifier; and determine an updated user-associated ranking for the group-defined graphical object set based on the message metadata, the at least one text object, and the second user identifier. In some embodiments, the group-based communication apparatus is further configured to determine a topic-defined graphical object set by comparing the at least one text object to a keyword set of each graphical object of the group-defined graphical object set; and determine an updated user-associated ranking for the group-defined graphical object set based on the message metadata and the topic-defined graphical object set.

In some embodiments, determining the user-associated ranking for the group-defined graphical object set based on the user graphical object data comprises determining a graphical object score for each graphical object in the group-defined graphical object set. In some embodiments, the graphical object score is at least based on a use frequency score associated with the respective graphical object. In some embodiments, the graphical object score is at least based on a user-preferred score associated with the respective graphical object. In some embodiments, the group-based communication apparatus is further configured to access a role identifier associated with the user identifier; and determine the user-associated ranking for the group-defined graphical object set based on the user graphical object data and the role identifier.

In accordance with another aspect, a computer-implemented method for outputting suggested graphical objects to a group-based communication interface of a group-based communication platform is provided. The computer-implemented method comprises receiving a user identifier and a group identifier; accessing a group-defined graphical object set based on the group identifier; accessing user graphical object data associated with the user identifier; determining a user-associated ranking for the group-defined graphical object set based on the user graphical object data; receiving a messaging communication provision request; and in response to receiving the messaging communication provision request, determining at least one suggested graphical object based on the user-associated ranking and cause rendering of the at least one suggested graphical object to a graphical object selection interface.

In one embodiment, the computer-implemented method further comprises accessing a messaging communication associated with the messaging communication provision request, the messaging communication comprising message metadata and draft body content data; parsing the draft body content data to identify at least one text object; determining an updated user-associated ranking for the group-defined graphical object set based on the message metadata and the at least one text object; and determining at least one suggested graphical object based on the updated user-associated ranking and causing rendering of the at least one suggested graphical object to the graphical object selection interface.

In another embodiment, the computer-implemented method further comprises parsing the draft body content data to identify at least one text object, wherein the at least one text object is associated with a second user identifier; and determining an updated user-associated ranking for the group-defined graphical object set based on the message metadata, the at least one text object, and the second user identifier. In some embodiments, the computer-implemented method further comprises determining a topic-defined graphical object set by comparing the at least one text object to a keyword set of each graphical object of the group-defined graphical object set; and determining an updated user-associated ranking for the group-defined graphical object set based on the message metadata and the topic-defined graphical object set.

In some embodiments, determining the user-associated ranking for the group-defined graphical object set based on the user graphical object data comprises determining a graphical object score for each graphical object in the group-defined graphical object set. In some embodiments, the graphical object score is at least based on a use frequency score associated with the respective graphical object. In some embodiments, the graphical object score is at least based on a user-preferred score associated with the respective graphical object. In some embodiments, the computer-implemented method further comprises accessing a role identifier associated with the user identifier; and determining the user-associated ranking for the group-defined graphical object set based on the user graphical object data and the role identifier.

In accordance with another aspect, a computer program product is provided. The computer program product comprises at least one non-transitory computer-readable storage medium having computer-readable program code portions stored therein. The computer-readable program code portions comprising an executable portion configured to receive a user identifier and a group identifier; access a group-defined graphical object set based on the group identifier; access user graphical object data associated with the user identifier; determine a user-associated ranking for the group-defined graphical object set based on the user graphical object data; receive a messaging communication provision request; and in response to receiving the messaging communication provision request, determine at least one suggested graphical object based on the user-associated ranking and cause rendering of the at least one suggested graphical object to a graphical object selection interface.

In one embodiment, the computer-readable program code portions comprise an executable portion further configured to access a draft messaging communication associated with the messaging communication provision request, the draft messaging communication comprising message metadata and draft body content data; parse the draft body content data to identify at least one text object; determine an updated user-associated ranking for the group-defined graphical object set based on the message metadata and the at least one text object; and determine at least one suggested graphical object based on the updated user-associated ranking and cause rendering of the at least one suggested graphical object to the graphical object selection interface. In another embodiment, the computer-readable program code portions comprise an executable portion further configured to parse the draft body content data to identify at least one text object, wherein the at least one text object is associated with a second user identifier; and determine an updated user-associated ranking for the group-defined graphical object set based on the message metadata, the at least one text object, and the second user identifier. In some embodiments, the computer-readable program code portions comprise an executable portion further configured to determine a topic-defined graphical object set by comparing the at least one text object to a keyword set of each graphical object of the group-defined graphical object set; and determine an updated user-associated ranking for the group-defined graphical object set based on the message metadata and the topic-defined graphical object set.

In some embodiments, determining the user-associated ranking for the group-defined graphical object set based on the user graphical object data comprises determining a graphical object score for each graphical object in the group-defined graphical object set. In some embodiments, the graphical object score is at least based on a use frequency score associated with the respective graphical object. In some embodiments, the graphical object score is at least based on a user-preferred score associated with the respective graphical object. In some embodiments, the computer-readable program code portions comprise an executable portion further configured to access a role identifier associated with the user identifier; and determine the user-associated ranking for the group-defined graphical object set based on the user graphical object data and the role identifier.

An exemplary group-based communication apparatus configured to render suggested graphical objects within a group-based communication platform comprises at least one processor and at least one non-transitory memory including program code, the at least one non-transitory memory and the program code configured to, with the processor, cause the apparatus to at least: receive a user identifier and a group identifier; access a graphical object set based on the group identifier; determine a ranking for the graphical object set based on the user identifier; receive a request for a graphical object interface; and in response to receiving the request, determine at least one suggested graphical object based on the ranking and cause rendering of the at least one suggested graphical object to a graphical object selection interface.

In some embodiments, the memory including the program code is further configured to, with the processor, cause the apparatus to: access a messaging communication associated with the request, the messaging communication comprising metadata and content data; parse the content data to identify at least one text object; update a ranking for the graphical object set based on the metadata and the at least one text object; and in response to determining at least one suggested graphical object based on the updated ranking, cause rendering of the at least one suggested graphical object to the graphical object selection interface.

In some embodiments, the memory including the program code is further configured to, with the processor, cause the apparatus to: access a messaging communication associated with the request, the messaging communication comprising metadata and content data; parse the content data to identify at least one text object, wherein the at least one text object is associated with a second user identifier; update a ranking for the graphical object set based on the metadata, the at least one text object, and the second user identifier; and in response to determining at least one suggested graphical object based on the updated ranking, cause rendering of the at least one suggested graphical object to the graphical object selection interface.

In some embodiments, the memory including the program code is further configured to, with the processor, cause the apparatus to: access a messaging communication associated with the request, the messaging communication comprising metadata and content data; parse the content data to identify at least one text object; determine one or more graphical objects by comparing the at least one text object to a keyword set of each graphical object of the graphical object set; update a ranking for the graphical object set based on the metadata and the determined one or more objects; and in response to determining at least one suggested graphical object based on the updated ranking, cause rendering of the at least one suggested graphical object to the graphical object selection interface.

In some embodiments, the memory including the program code is further configured to, with the processor, cause the apparatus to: analyze one or more messaging communications comprising a graphical object; derive, based on the one or more messaging communications, a keyword; and associate the keyword with the keyword set of the graphical object.

In some embodiments, the keyword is derived using one or more machine-learning algorithms.

In some embodiments, determining the ranking for the graphical object set comprises: determining a score for each graphical object in the graphical object set, wherein the score is based on at least one of a user frequency score or a user preference associated with the respective graphical object.

In some embodiments, the memory including the program code is further configured to, with the processor, cause the apparatus to: access a role identifier associated with the user identifier; and determine the ranking for the graphical object set based on the role identifier.

An exemplary computer-implemented method for rendering suggested graphical objects within a group-based communication interface of a group-based communication platform comprises: receiving a user identifier and a group identifier; accessing a graphical object set based on the group identifier; determining a ranking for the graphical object set based on the user identifier; receiving a request for a graphical object interface; and in response to receiving the request, determining at least one suggested graphical object based on the ranking and cause rendering of the at least one suggested graphical object to a graphical object selection interface.

In some embodiments, the computer-implemented method further comprises: accessing a messaging communication associated with the request, the messaging communication comprising metadata and content data; parsing the content data to identify at least one text object; updating a ranking for the graphical object set based on the metadata and the at least one text object; and in response to determining at least one suggested graphical object based on the updated ranking, cause rendering of the at least one suggested graphical object to the graphical object selection interface.

In some embodiments, the computer-implemented method, further comprises: accessing a messaging communication associated with the request, the messaging communication comprising metadata and content data; parsing the content data to identify at least one text object; determining one or more graphical objects by comparing the at least one text object to a keyword set of each graphical object of the graphical object set; updating a ranking for the graphical object set based on the metadata and the determined one or more objects; and in response to determining at least one suggested graphical object based on the updated ranking, cause rendering of the at least one suggested graphical object to the graphical object selection interface.

In some embodiments, determining the ranking for the graphical object set comprises: determining a score for each graphical object in the graphical object set, wherein the score is based on at least one of a user frequency score or a user preference associated with the respective graphical object.

In some embodiments, the computer-implemented method further comprises: accessing a role identifier associated with the user identifier; and determining the ranking for the graphical object set based on the role identifier.

In some embodiments, the computer-implemented method further comprises: analyzing one or more messaging communications comprising a graphical object; deriving, based on the one or more messaging communications, a keyword; and associating the keyword with the keyword set of the graphical object.

In some embodiments, the keyword is derived using one or more machine-learning algorithms.

An exemplary computer program product comprises at least one non-transitory computer-readable storage medium having computer-readable program code portions stored therein, comprising an executable portion configured to: receive a user identifier and a group identifier; access a graphical object set based on the group identifier; determine a ranking for the graphical object set based on the user identifier; receive a request for a graphical object interface; and in response to receiving the request, determine at least one suggested graphical object based on the ranking and cause rendering of the at least one suggested graphical object to a graphical object selection interface.

In some embodiments, the computer-readable program code portions comprising the executable portion are configured to further: access a messaging communication associated with the request, the messaging communication comprising metadata and content data; parse the content data to identify at least one text object; update a ranking for the graphical object set based on the metadata and the at least one text object; and in response to determining at least one suggested graphical object based on the updated ranking, cause rendering of the at least one suggested graphical object to the graphical object selection interface.

In some embodiments, the computer-readable program code portions comprising the executable portion are configured to further: access a messaging communication associated with the request, the messaging communication comprising metadata and content data; parse the content data to identify at least one text object; determine one or more graphical objects by comparing the at least one text object to a keyword set of each graphical object of the graphical object set; update a ranking for the graphical object set based on the metadata and the determined one or more objects; and in response to determining at least one suggested graphical object based on the updated ranking, cause rendering of the at least one suggested graphical object to the graphical object selection interface.

In some embodiments, determining the ranking for the graphical object set comprises: determining a score for each graphical object in the graphical object set, wherein the score is based on at least one of a user frequency score or a user preference associated with the respective graphical object.

In some embodiments, the computer-readable program code portions comprising the executable portion are configured to further: access a role identifier associated with the user identifier; and determine the ranking for the graphical object set based on the role identifier.

An exemplary group-based communication apparatus configured to render suggested graphical objects within a group-based communication platform comprises at least one processor and at least one non-transitory memory including program code, the at least one non-transitory memory and the program code configured to, with the processor, cause the apparatus to at least: receive a user identifier and a group identifier; access a graphical object set based on the group identifier; determine a ranking for the graphical object set based on the user identifier; receive a request to post a draft messaging communication; and in response to receiving the request, determine at least one suggested graphical object based on the ranking and cause rendering of the at least one suggested graphical object to a graphical object selection interface.

In some embodiments, the memory including the program code is further configured to, with the processor, cause the apparatus to: access the draft messaging communication associated with the request, the draft messaging communication comprising metadata and draft content data; parse the draft content data to identify at least one text object; update a ranking for the graphical object set based on the metadata and the at least one text object; and in response to determining at least one suggested graphical object based on the updated ranking, cause rendering of the at least one suggested graphical object to the graphical object selection interface.

In some embodiments, the memory including the program code is further configured to, with the processor, cause the apparatus to: access the draft messaging communication associated with the request, the messaging communication comprising metadata and draft content data; parse the draft content data to identify at least one text object, wherein the at least one text object is associated with a second user identifier; updating a ranking for the graphical object set based on the metadata, the at least one text object, and the second user identifier; and in response to determining at least one suggested graphical object based on the updated ranking, cause rendering of the at least one suggested graphical object to the graphical object selection interface.

In some embodiments, the memory including the program code is further configured to, with the processor, cause the apparatus to: access the draft messaging communication associated with the request, the messaging communication comprising metadata and draft content data; parse the draft content data to identify at least one text object; determine one or more graphical objects by comparing the at least one text object to a keyword set of each graphical object of the graphical object set; update a ranking for the graphical object set based on the metadata and the determined one or more graphical objects; and in response to determining at least one suggested graphical object based on the updated ranking, cause rendering of the at least one suggested graphical object to the graphical object selection interface.

In some embodiments, the memory including the program code is further configured to, with the processor, cause the apparatus to: analyze one or more messaging communications comprising a graphical object; derive, based on the one or more messaging communications, a keyword; and associate the keyword with the keyword set of the graphical object.

In some embodiments, the keyword is derived using one or more machine-learning algorithms.

In some embodiments, determining the ranking for the graphical object set comprises: determining a score for each graphical object in the graphical object set, wherein the score is at least based on a use frequency score associated with the respective graphical object or a user preference associated with the respective graphical object.

In some embodiments, the memory including the program code is further configured to, with the processor, cause the apparatus to: access a role identifier associated with the user identifier; and determine the ranking for the graphical object set based on the role identifier.

An exemplary computer-implemented method for rendering suggested graphical objects within a group-based communication platform comprises: receiving a user identifier and a group identifier; accessing a graphical object set based on the group identifier; determining a ranking for the graphical object set based on the user identifier; receiving a request to post a draft messaging communication; and in response to receiving the request, determining at least one suggested graphical object based on the ranking and cause rendering of the at least one suggested graphical object to a graphical object selection interface.

In some embodiments, the computer-implemented method further comprises: accessing the draft messaging communication associated with the request, the draft messaging communication comprising metadata and draft content data; parsing the draft content data to identify at least one text object; updating a ranking for the graphical object set based on the metadata and the at least one text object; and in response to determining at least one suggested graphical object based on the updated ranking, causing rendering of the at least one suggested graphical object to the graphical object selection interface.

In some embodiments, the memory including the program code is further configured to, with the processor, cause the apparatus to: access the draft messaging communication associated with the request, the messaging communication comprising metadata and draft content data; parse the draft content data to identify at least one text object, wherein the at least one text object is associated with a second user identifier; update a ranking for the graphical object set based on the metadata, the at least one text object, and the second user identifier; and in response to determining at least one suggested graphical object based on the updated ranking, cause rendering of the at least one suggested graphical object to the graphical object selection interface.

In some embodiments, the memory including the program code is further configured to, with the processor, cause the apparatus to: access the draft messaging communication associated with the request, the messaging communication comprising metadata and draft content data; parse the draft content data to identify at least one text object; determine one or more graphical objects by comparing the at least one text object to a keyword set of each graphical object of the graphical object set; update a ranking for the graphical object set based on the metadata and the determined one or more graphical objects; and in response to determining at least one suggested graphical object based on the updated ranking, cause rendering of the at least one suggested graphical object to the graphical object selection interface.

In some embodiments, the computer-implemented method, further comprises: analyzing one or more messaging communications comprising a graphical object; deriving, based on the one or more messaging communications, a keyword; and associating the keyword with the keyword set of the graphical object.

In some embodiments, the keyword is derived using one or more machine-learning algorithms.

In some embodiments, determining the ranking for the graphical object set comprises: determining a score for each graphical object in the graphical object set, wherein the score is at least based on a use frequency score associated with the respective graphical object or a user preference associated with the respective graphical object.

In some embodiments, the memory including the program code is further configured to, with the processor, cause the apparatus to: access a role identifier associated with the user identifier; and determine the ranking for the graphical object set based on the role identifier.

An exemplary computer program product comprises at least one non-transitory computer-readable storage medium having computer-readable program code portions stored therein, comprising an executable portion configured to: receive a user identifier and a group identifier; access a graphical object set based on the group identifier; determine a ranking for the graphical object set based on the user identifier; receive a request to post a draft messaging communication; and in response to receiving the request, determine at least one suggested graphical object based on the ranking and cause rendering of the at least one suggested graphical object to a graphical object selection interface.

In some embodiments, the computer-readable program code portions comprising the executable portion are configured to further: access the draft messaging communication associated with the request, the draft messaging communication comprising metadata and draft content data; parse the draft content data to identify at least one text object; update a ranking for the graphical object set based on the metadata and the at least one text object; and in response to determining at least one suggested graphical object based on the updated ranking, cause rendering of the at least one suggested graphical object to the graphical object selection interface.

In some embodiments, the computer-readable program code portions comprising the executable portion are configured to further: access the draft messaging communication associated with the request, the messaging communication comprising metadata and draft content data; parse the draft content data to identify at least one text object, wherein the at least one text object is associated with a second user identifier; update a ranking for the graphical object set based on the metadata, the at least one text object, and the second user identifier; and in response to determining at least one suggested graphical object based on the updated ranking, cause rendering of the at least one suggested graphical object to the graphical object selection interface.

In some embodiments, the computer-readable program code portions comprising the executable portion are configured to further: access the draft messaging communication associated with the request, the messaging communication comprising metadata and draft content data; parse the draft content data to identify at least one text object; determine one or more graphical objects by comparing the at least one text object to a keyword set of each graphical object of the graphical object set; update a ranking for the graphical object set based on the metadata and the one or more graphical objects; and in response to determining at least one suggested graphical object based on the updated ranking, cause rendering of the at least one suggested graphical object to the graphical object selection interface.

In some embodiments, determining the ranking for the graphical object set comprises: determining a score for each graphical object in the graphical object set, wherein the score is at least based on a use frequency score associated with the respective graphical object or a user preference associated with the respective graphical object.

In some embodiments, the computer-readable program code portions comprising the executable portion are configured to further: access a role identifier associated with the user identifier; and determine the ranking for the graphical object set based on the role identifier.

BRIEF DESCRIPTION OF THE SEVERAL VIEWS OF THE DRAWINGS

Reference will now be made to the accompanying drawings, which are not necessarily drawn to scale, and wherein:

FIG. 5B is a signal diagram of an example data flow in accordance with one embodiment;

DETAILED DESCRIPTION

Figure 1:
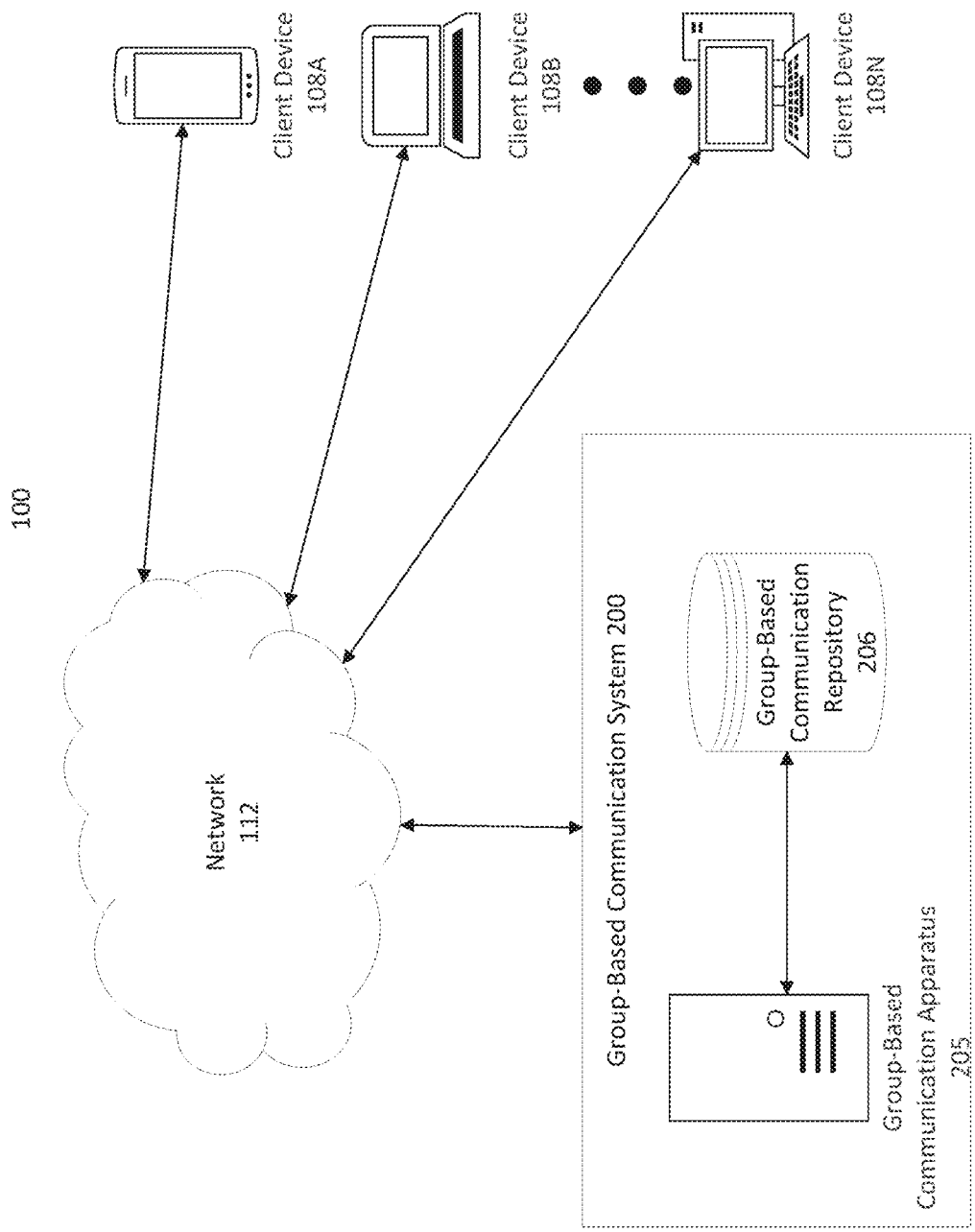
FIG. 1 shows a schematic view of a group-based communication system in communication with client devices according to various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, users may communicate with one another in a myriad of ways. In some embodiments, the group-based communication system is a channel-based messaging platform. For example, a user may be a member of one or more group-based communication workspaces, each group-based communication workspace dedicated to a particular organizational group or team having a defined member list (i.e., a defined list of authenticated user profiles).

Each group-based communication workspace includes a plurality of group-based communication channels. Upon accessing a group-based communication interface to interact with an associated group-based communication channel, a user (by way of a client device) may generate and transmit one or more messaging communications to a group-based communication server to be rendered within the group-based communication interface. The user may also view, respond to, and/or otherwise interact with one or more messaging communications transmitted by others to the group-based communication server and rendered within a group-based communication interface associated with the group-based communication channel.

When drafting a messaging communication, a user may desire to include one or more graphical objects (e.g., emojis, emoticons, and/or the like) in the messaging communication. Additionally, or alternatively, when viewing messaging communications posted by other users (i.e., transmitted to the group-based communication server and rendered within a group-based communication channel interface), a user may desire to respond, or react, to a messaging communication by using one or more graphical objects. For instance, a first user may draft a messaging communication (e.g., intended for posting within a particular group-based communication channel) with text comprising "Anyone for lunch?" and may desire to append a graphical object illustrating a slice of pizza to the end of the messaging communication. Once the messaging communication has been rendered within a group-based communication interface associated with the group-based communication channel, a second user may indicate a willingness to attend lunch with the first user by responding, or reacting, to the messaging communication with a graphical object illustrating, for example, a 'checkmark' or 'thumbs up' symbol (e.g., emoji). However, these users may experience frustration when attempting to select their respective graphical object for use. For example, a graphical object selection interface may list a large number of graphical objects in a predefined order, a majority of which may be irrelevant to the user and/or to the messaging communication. Thus, the user may be forced to scroll, search, or otherwise take time to navigate through the provided list to locate a desired graphical object. Further, while the user may desire to select a graphical object, it may be unclear to the user exactly which graphical object would be most appropriate to associate with the messaging communication or to display to other users in the group-based communication channel. Thus, a plurality of graphical objects provided within a graphical object selection interface may not be terribly meaningful to a given user and not suggestive of one or more other users of a group-based communication channel nor of one or more messaging communications posted to the group-based communication channel. Further, rendering an entire plurality of graphical objects in a group-defined graphical object set in a graphical object selection interface may be too computationally intense for certain client devices.

Various embodiments of the present invention are directed to an improved group-based communication apparatus that is configured to efficiently determine suggested graphical objects to users of a group-based communication system.

In one example, user graphical object data is stored by the group-based communication apparatus. The group-based communication apparatus is configured to determine a user-associated ranking for a group-defined graphical object set based on the user graphical object data. Upon receiving a graphical object interface request, the group-based communication apparatus may determine at least one suggested graphical object based on the user-associated ranking. The at least one suggested graphical object may then be rendered to a graphical object selection interface to provide the user with suggested graphical objects relevant to the user, a messaging communication, and/or one or more other users, as well as the immediate ability to select the at least one suggested graphical object for use and/or inclusion in a messaging communication. By providing the user with suggested graphical objects, a group-based communication apparatus may render, at a client device associated with the user, only suggested graphical objects to a graphical object selection interface and need not render an entire plurality of graphical objects in a group-defined graphical object set, thereby providing improved computational efficiency along with additional client device screen space. Computational efficiency of a client device may further be improved by a user not having to search and/or scroll to locate a desired graphical object for selection. Additionally, by reducing the number of graphical objects rendered to a graphical object selection interface to only suggested graphical objects relevant to a user, graphical objects that may initially be transmitted to the client device may be reduced, thereby reducing cache and memory requirements of the client device and/or group-based communication apparatus.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 200 via a communications network 112 using client devices 108A-108N. The group-based communication system 200 may comprise a group-based communication apparatus 205 in communication with at least one group-based communication repository 206. The group-based communication system 200 is a group-based system, which can include a system, channel, communication, message, or virtual environment that has security sufficient such that it is accessible only to a defined group of users (i.e., group members sharing a common group identifier). In some embodiments, the group-based communication system 200 is a channel-based messaging platform. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, users, group-based communication channels, etc., with specific groups of a group-based communication system.

The group-based communication system 200 can include a communications software platform and associated hardware that is configured to support and maintain a plurality of group-based communication workspaces and all associated functionality. Group-based communication system users are organized into organization groups (e.g., employees of different companies may embody separate organization groups) and each group interacts with the system via a respective group-based communication workspace. For example, the group-based communication system might support, among others, an ACME Corporation group-based communication workspace and an BETA Corporation group-based communication workspace. Example group-based communication systems comprise supporting servers, client devices, and third-party resources.

In some embodiments, the group-based communication workspace comprises a virtual communications environment configured to facilitate user interaction with a group-based communication system. Each group-based communication workspace is accessible and viewable (as a group-based communication interface defined below) to a validated group of users, such as a group of employees of a business or organization (e.g., the ACME Corporation workspace would be accessible and viewable to the ACME employees however the BETA Corporation group-based communication workspace would not be accessible and viewable to ACME employees). The group-based communication workspace includes a plurality of group-based communication channels (e.g., a marketing channel, sales channel, accounting channel, etc.), which are defined herein. In various embodiments, user profiles sharing a common group identifier (defined below) form part of a common group-based communication workspace.

The group-based communication channel can include a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. Group-based communication channels are typically organized in list form within the sidebar of the group-based communication interface based on channel identifiers. In some embodiments, a channel identifier is a channel name. In some embodiments, a channel identifier comprises a text string that is conceived and stored at the time a group-based communication channel is created for common identification to all members of the group-based communication channel. In many embodiments, channel identifiers are created based on a group-wide nomenclature/procedure so that group members may readily understand the purpose of any associated group-based communication channel. Example channel identifiers include: #accounting—audit 2019, #accounting—payroll, #HR—onboarding procedure, #food truck frenzy, and the like.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a messaging communication (e.g., access to the messaging communication may be restricted to those users having the group-based communication channel identifier associated with their user profile, or who have the ability to join the group-based communication channel). The group-based communication channel identifier may be used to determine context for the messaging communication (e.g., a description of the group-based communication channel, such as a description of a project discussed in the group-based communication channel, may be associated with the group-based communication channel identifier). In some embodiments, a channel identifier and a group-based communication channel identifier can refer to one or more items of data by which a group-based communication channel may be identified. For example, a group-based communication channel identifier may comprise ASCII text, a pointer, a memory address, and the like.

In some embodiments, user profile can include information of a group-based communication system that is associated with a user, including, for example, a user identifier, a role identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of graphical objects (e.g., favorite emojis), a plurality of conversations, a plurality of conversation topics, an avatar, an email address, a real name (e.g., John Doe), a username (e.g., jdoe), a password, a real name, a time zone, a status, and the like. The user profile details can include a subset designation of user credentials, such as, for example, login information for the user including the user's username and password.

The group-based communication apparatus 205 (or group-based communication server) can comprise a software platform and associated hardware that is configured to manage access to the various group-based communication workspaces of the group-based communication system. The group-based communication server is configured to access, maintain, and support application product logic of the group-based communication system and to access one or more data repositories such as a group-based communication repository.

The group-based communication interface can include a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device. In other embodiments, such data and instructions are provided through a web browser running on the client device. Each group-based communication interface is visually configured to define a sidebar pane and a message pane. A "sidebar pane" is configured to display lists of group-based communication channels and is typically organized by channel identifiers. A "message pane" is configured to display one or more messaging communications of a group-based communication channel upon user selection of a group-based communication channel from the sidebar pane.

Client devices 108A-108N can include any computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Users of the group-based communication system 200 can include an individual, group of individuals, business, organization, and the like. The users referred to herein are enabled to access a group-based communication system using client devices. Each user of the group-based communication system is associated with at least one group identifier.

Communications network 112 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 112 may include a cellular telephone, an 802.11, 802.16, 802.20, and/or WiMax network. Further, the communications network 112 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

While a particular computing device can be described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The group-based communication apparatus 205 may be embodied as a computer or computers. The group-based communication apparatus 205 may provide for receiving of electronic data from various sources, including but not necessarily limited to the client devices 108A-108N. For example, the group-based communication apparatus 205 may be operable to receive and transmit group-based messaging communications provided by the client devices 108A-108N.

The group-based communication repository 206 may be embodied as a data storage device such as a Network Attached Storage (NAS) device or devices, or as a separate database server or servers. The group-based communication repository 206 includes information accessed and stored by the group-based communication apparatus 205 to facilitate the operations of the group-based communication system 200. For example, the group-based communication repository 206 may include, without limitation, a plurality of messaging communications organized among a plurality of group-based communication channels, user graphical object data, and/or the like.

In some embodiments, group-based communication repository 206 comprises the location, such as a memory device, where user graphical object data, group-based communication messaging, and other group-based communication system data is stored. The group-based communication repository may be a dedicated device and/or a part of a larger repository. The group-based communication repository may be dynamically updated or be static. For example, the user graphical object data may be uploaded to the group-based communication repository simultaneously with the creation of the user graphical object data. Alternatively, the user graphical object data may not be uploaded simultaneously upon creation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of user graphical object data and associated engagement data.

The client devices 108A-108N may be any computing device as defined above. Electronic data received by the group-based communication apparatus 205 from the client devices 108A-108N may be provided in various forms and via various methods. For example, the client devices 108A-108N may include desktop computers, laptop computers, smartphones, netbooks, tablet computers, wearables, and the like.

In embodiments where a client device 108A-108N is a mobile device, such as a smartphone or tablet, the client device 108A-108N may execute an "app" to interact with the group-based communication system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 108A-108N may interact with the group-based communication system 200 via a web browser. As yet another example, the client devices 108A-108N may include various hardware or firmware designed to interface with the group-based communication system 200.

In some embodiments of an exemplary group-based communication system 200, a messaging communication may be sent from a client device 108A-108N to a group-based communication system 200. In various implementations, the messaging communication may be sent to the group-based communication system 200 over communications network 112 directly by a client device 108A-108N, the messaging communication may be sent to the group-based communication system 200 via an intermediary such as a message server, and/or the like. For example, the client device 108A-108N may be a desktop, a laptop, a tablet, a smartphone, and/or the like that is executing a client application (e.g., a group-based communication app). In one implementation, the messaging communication may include data such as a message identifier, sending user identifier, a group identifier, a group-based communication channel identifier, body content data (e.g., text, emojis, images, links), attachments (e.g., files), message hierarchy data (e.g., the messaging communication may be a reply to another message), third party metadata, and/or the like.

In some embodiments, a messaging communication can include any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication. Each messaging communication sent or posted to a group-based communication channel of the group-based communication system includes message metadata comprising the following: a sending user identifier, a message identifier, a group identifier, and a group-based communication channel identifier. In some embodiments, message metadata also comprises a timestamp that identifies the time that a messaging communication was transmitted (i.e., sent) to a group-based communication server for rendering within a group-based communication interface associated with a group-based communication channel. In some embodiments, a messaging communication further includes a published identifier among the message metadata that indicates whether the messaging communication is in a draft messaging communication (defined below). Each of the foregoing identifiers may comprise ASCII text, a pointer, a memory address, and the like. In addition to message metadata, messaging communications also include body content data that comprises text, an image, a file, video, or the like.

In one embodiment, the client device 108A-108N may provide the following example messaging communication, substantially in the form of a (Secure) Hypertext Transfer Protocol ("HTTP(S)") POST message including eXtensible Markup Language ("XML") formatted data, as provided below:

POST /authrequest.php HTTP/1.1

Host: www.server.com

Content-Type: Application/XML

Content-Length: 667

-continued

```
<?XML version = "1.0" encoding = "UTF-8"?>
<auth_request>
    <timestamp>2020-12-31 23:59:59</timestamp >
    <user_accounts_details>
        <user_account_credentials>
            <user_name>ID_user_1</user_name>
            <password>abc123</password>
            //OPTIONAL <cookie>cookieID</cookie>
            //OPTIONAL      <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS X)
AppleWebKit/537.51.2   (KHTML,   like   Gecko)   Version/7.0   Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2   (KHTML,   like   Gecko)   Version/7.0   Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D)   AppleWebKit/534.30   (KHTML,   like   Gecko)   Version/4.0)   Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0) (Macintosh;) Intel) Mac) OS) X) 10_9_3)
AppleWebKit/537.75.14   (KHTML,   like   Gecko)   Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
```

```
        <message_identifier>ID_message_10</message_identifier>
        <team_identifier>ID_team_1</team_identifier>
        <channel_identifier>ID_channel_1</channel_identifier>
        <body contents>That is an interesting invention. I have attached a copy our patent
policy.</body contents>
        <attachments>patent_policy.pdf</attachments>
    </message>
</auth_request>
```

The group-based communication system 200 comprises at least one group-based communication apparatus 205 that may create a storage message based upon the received messaging communication to facilitate message indexing and storage in a group-based communication repository 206. In one implementation, the storage message may include data such as a message identifier, a group identifier, a group-based communication channel identifier, a sending user identifier, topics, responses, message contents (i.e., body content data), attachments, message hierarchy data, third party metadata, conversation primitive data, and/or the like. For example, the group-based communication apparatus 205 may provide the following example storage message, substantially in the form of a HTTP(S) POST message including XML-formatted data, as provided below:

sage identifier, a group identifier, and a group-based communication channel identifier. In some embodiments, the message metadata comprises a timestamp that identifies the time of the messaging communication. As graphical objects are added or appended to a selected message communication (e.g., as emojis or reaction), the group-based communication system is configured to add graphical object identifiers associated with such added graphical objects to the message metadata associated with the selected messaging communication. A graphical object identifier can include one or more items of data by which a graphical object is identified by the group-based communication system. For example, a graphical object identifier may comprise ASCII text, a Unicode character or string, a numeric ID, a pointer, a memory address, and the like.

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID_user_3</response>
    </responses>
    <body contents>That is an interesting disclosure. I have attached a copy our patent
policy.</body contents>
    <attachments>patent_policy.pdf</attachments>
    <conversation_primitive>
        conversation includes messages: ID_message_8, ID_message_9, ID_message_10,
        ID_message_11, ID_message_12
    </conversation_primitive>
</storage_message>
```

In embodiments, a sending user identifier may be associated with the messaging communication. In one implementation, message metadata associated with the messaging communication may be parsed (e.g., using PHP—i.e., the script language derived from Personal Home Page Tools—commands) to determine a sending user identifier of the user who sent the message.

In some embodiments, message metadata includes data that describes messaging communications and is used to index, render, query, or organize messaging communications within a group-based communication system. Each messaging communication transmitted to a group-based communication server and rendered within a group-based communication channel interface includes message metadata comprising the following: a sending user identifier, a mes- In embodiments, text objects may be associated with the messaging communication. In one implementation, the body content data may be parsed (e.g., using PHP commands) to determine text objects discussed in the messaging communication. A topic-defined graphical object set may then be determined by comparing the at least one text object to a keyword set of each graphical object of the group-defined graphical object set. For example, hashtags in the message may indicate topics associated with the message. In another example, special characters (e.g., "@") may indicate a text object associated with a user identifier. In another example, the messaging communication may be analyzed (e.g., by itself, with other messaging communications in a conversation primitive) or parsed using a machine learning technique, such as topic modeling, to determine topics associated with the messaging communication.

In some embodiments, text object can include a character or sequence of characters (e.g. a text string) found in body content data (or draft body content data) that represent at least part of the written text portion of a messaging communication. In some embodiments, text objects are identified by parsing the body content data of a messaging communication. A text object may identify a word or phrase that includes letters, numerical digits, punctuation marks, special characters, symbols, whitespace, and the like. In some embodiments, text objects are associated with a user identifier. For example, a user providing a messaging communication may tailor the messaging communication to a second user by including an identifying feature (e.g., a username, real name, nickname, etc.) of the second user along with a special character (e.g. @) as text in the body content data. The text object comprising the identifying feature of the second user and special character may be associated with the user identifier of the second user. In one embodiment, one or more text objects may be associated with a graphical object. For example, text objects associated with a graphical object may serve to identify, describe, or relate to the graphical object. A text object may comprise ASCII text, a pointer, a memory address, and the like.

In embodiments, data indicating responses may be associated with the messaging communication. For example, responses to the messaging communication by other users may include reactions (e.g., selection of a graphical object such as an emoji associated with the messaging communication, selection of a "like" button associated with the message), clicking on a hyperlink embedded in the messaging communication, replying to the messaging communication (e.g., posting a messaging communication to the group-based communication channel in response to the messaging communication), downloading a file associated with the messaging communication, sharing the messaging communication from one group-based communication channel to another group-based communication channel, pinning the messaging communication, starring the messaging communication, and/or the like. In one implementation, data regarding responses to the messaging communication by other users may be included with the messaging communication, and the messaging communication may be parsed (e.g., using PHP commands) to determine the responses. In another implementation, data regarding responses to the messaging communication may be retrieved from a database. For example, data regarding responses to the messaging communication may be retrieved via a MySQL database command similar to the following:
SELECT messageResponses
FROM MSM_Message
WHERE messageID=ID_message_10.

For example, data regarding responses to the messaging communication may be used to determine context for the messaging communication (e.g., a social score for the messaging communication from the perspective of some user). In another example, data regarding responses to the messaging communication may be analyzed to determine context regarding the user (e.g., the user's expertise in a topic may be determined based on the responses to the user's messaging communication regarding the topic).

In embodiments, attachments may be included with the messaging communication. If there are attachments, files may be associated with the messaging communication. In one implementation, the messaging communication may be parsed (e.g., using PHP commands) to determine file names of the attachments. For example, file contents may be analyzed to determine context for the messaging communication (e.g., a patent policy document may indicate that the messaging communication is associated with the topic "patents").

In embodiments, message metadata may be associated with the messaging communication. For example, message metadata may provide additional context regarding the messaging communication or the user that is specific to a company, group, a group-based communication workspace, a group-based communication channel, and/or the like. In one implementation, the messaging communication may be parsed (e.g., using PHP commands) to determine message metadata. For example, message metadata may indicate whether the user who sent the messaging communication is an authorized representative of the group-based communication channel (e.g., an authorized representative may be authorized by the company to respond to questions in the group-based communication channel).

In embodiments, a conversation primitive may be associated with the messaging communication. In one implementation, a conversation primitive is an element used to analyze, store, and/or the like messaging communications. For example, the messaging communication may be analyzed by itself, and may form its own conversation primitive. In another example, the messaging communication may be analyzed along with other messaging communications that make up a conversation, and the messaging communications that make up the conversation may form a conversation primitive. In one implementation, the conversation primitive may be determined as the messaging communication, a specified number (e.g., two) of preceding messaging communications and a specified number (e.g., two) of following messaging communications. In another implementation, the conversation primitive may be determined based on analysis of topics discussed in the messaging communication and other messaging communications (e.g., in the group-based communication channel) and/or proximity (e.g., messaging communication send order proximity, messaging communication send time proximity) of these messages.

Example Apparatus for Implementing Embodiments of the Present Disclosure

Figure 2:
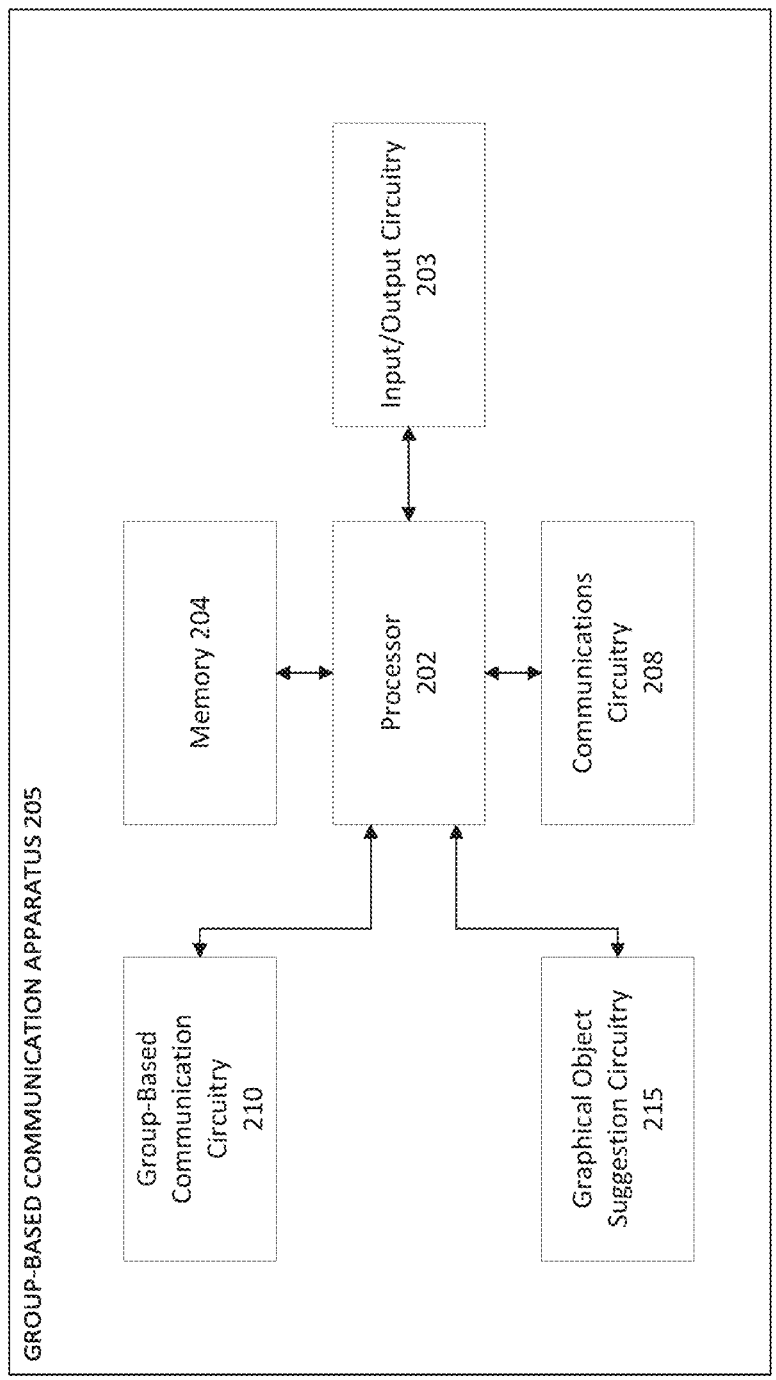
FIG. 2 shows a schematic view of a group-based communication apparatus according to one embodiment.

The group-based communication apparatus 205 may be embodied by one or more computing systems, such as group-based communication apparatus 205 shown in FIG. 2. The group-based communication apparatus 205 may include a processor 202, a memory 204, input/output circuitry 203, communications circuitry 208, group-based communication circuitry 210, and graphical object suggestion circuitry 215. The apparatus 205 may be configured, using one or more of the circuitry 203, 208, 210, and 215, to execute the operations described herein.

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 205 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the group-based communication apparatus 205 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 108A-108N (shown in FIG. 1) to enable messaging communication sharing therebetween. The processor 202 ensures that messaging communications intended for exchange between the client devices 108A-108N within the particular communication channel are properly disseminated to those client devices 108A-108N for display within respective message panes provided via the client devices 108A-108N.

Moreover, the processor 202 may be configured to synchronize messaging communications exchanged on a particular communication channel with a database for storage of messages therein. In certain embodiments, the processor 202 may provide stored messages for dissemination to client devices 108A-108N. The processor 202 may also provide to distribute such stored messages across various group-based communication workspaces and associated group-based communication channels as discussed herein.

In some embodiments, the group-based communication apparatus 200 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the group-based communication apparatus 205. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 210 includes hardware and software configured to support a group-based communication system 200. The group-based communication circuitry 210 may utilize processing circuitry, such as the processor 202, to perform these actions. The group-based communication circuitry 210 may send and/or receive data from group-based communication repository 206. In some implementations, the sent and/or received data may be group-based communication objects (e.g., messages, files, links, etc.) organized among a plurality of group-based communication channels. It should also be appreciated that, in some embodiments, the group-based communication circuitry 210 may include a separate processor, specially configured field programmable gate array (FPGA), or application specific interface circuit (ASIC).

The graphical object suggestion circuitry 215 includes hardware and software configured to support user-associated graphical object related functionality, features, and/or services of the group-based communication system 200. The graphical object suggestion circuitry 215 may utilize processing circuitry, such as the processor 202, to perform these actions. The graphical object suggestion circuitry 215 may send and/or receive data from group-based communication repository 206. In some implementations, the sent and/or received data may be user graphical object data, user-associated ranking data, and associated data that is configured for association with one or more group-based communication channels and/or users. It should also be appreciated that, in some embodiments, the graphical object suggestion circuitry 215 may include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 205. In some embodiments, one or more external systems (such as a remote cloud computing and/or data storage system, one or more external resources 110A-110N) may also be leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Processes for Practicing Embodiments of the Present Disclosure

Figure 3A:
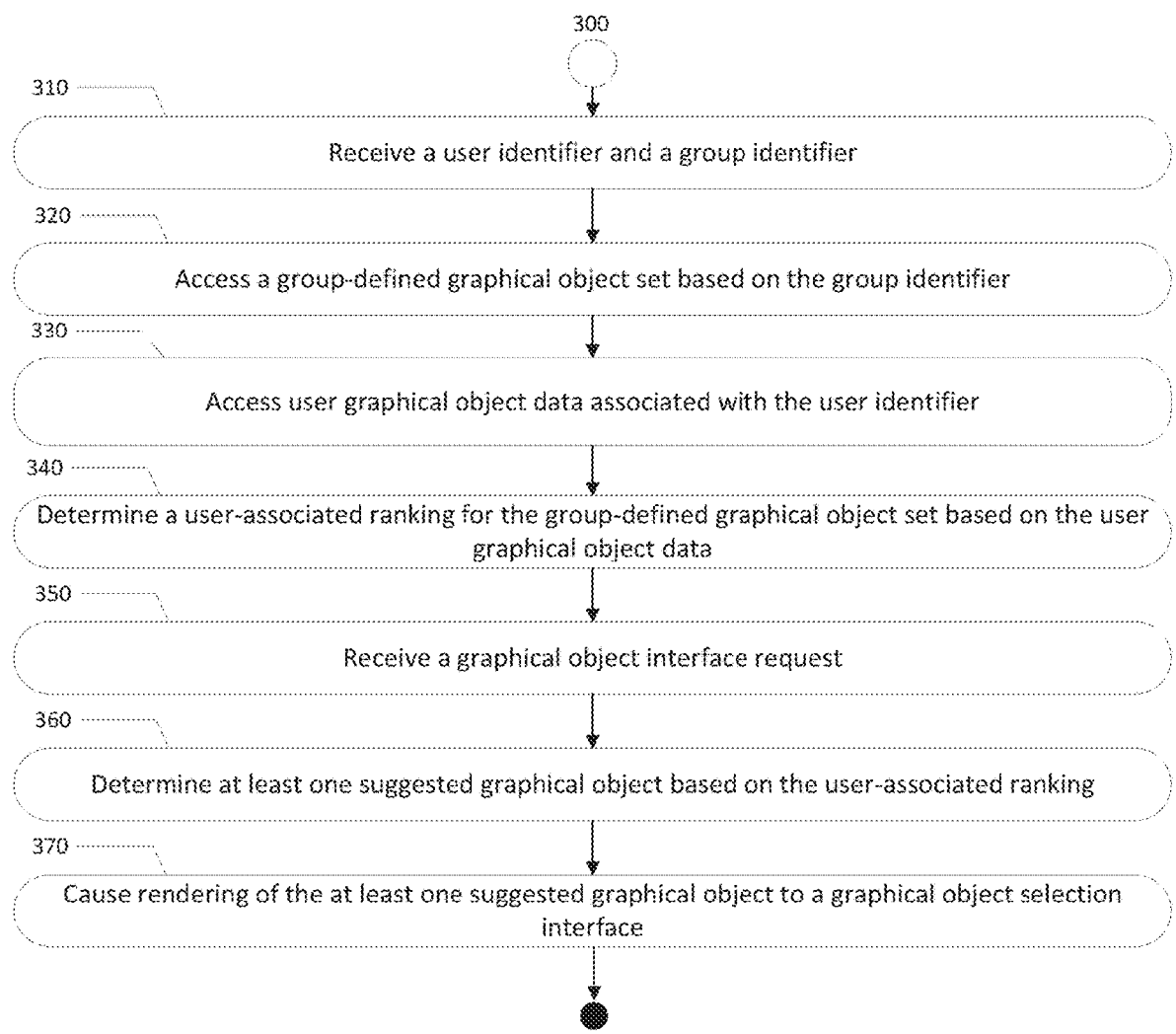
FIG. 3A is a flowchart illustrating example steps for causing rendering of at least one suggested graphical object to a graphical object selection interface configured in accordance with one embodiment.

In embodiments, the group-based communication apparatus 205 is configured to determine at least one suggested graphical object and cause rendering of the at least one suggested graphical object to a graphical object selection interface in accordance with the process blocks of the method 300 of FIG. 3A. A suggested graphical object can include a graphical object that is determined to be appropriate or acceptable to associate with a particular messaging communication and for a user to include in the messaging communication. A suggested graphical object can be determined by the graphical object suggestion circuitry of the group-based communication apparatus and based on a user-associated ranking, as described below.

In some embodiments, a graphical object includes a visual icon, avatar, emoji, emoticon, image, video, photo, symbol, icon, glyph, or graphic that may be used to label, tag, or otherwise distinguish a selected messaging communication from other messaging communications in a group-based communication channel. In some embodiments, the graphical object provides a visual illustration of a sentiment or emotion that an appending user intends for a selected messaging communication. The graphical object may be used to convey information succinctly, and/or communicate a message playfully without words. For instance, the graphical object may be an emoji, an emoticon, or other similar expressive visual identification means. In some embodiments, the graphical object may be animated, such as to illustrate movement between a first state and a second state when displayed within the selected group-based communication interface. In some embodiments, the graphical object is associated with a graphical object keyword set comprising one or more text objects. In an embodiment, the graphical object is associated with one or more scores. The graphical object may be added to or included in a messaging communication by selecting from a plurality of graphical objects displayed in a graphical object selection interface within a group-based communication interface.

In some embodiments, graphical object keyword set includes a set of one or more predefined text objects that are associated with a graphical object. A graphical object keyword set may be created and defined by a user, group, administrator, or other entity. In an embodiment, one or more text objects in a graphical object keyword set may be learned, via the group-based communication apparatus and associated circuitry, by analysis of a plurality of messaging communications over time. Text objects associated with body content data of a messaging communication (or, in some embodiments, draft body content data of a draft messaging communication) can be compared to graphical object keyword sets to determine or update a user-associated ranking for a group-defined graphical object set.

The depicted process begins at Block 310 where the group-based communication apparatus 205 receives a user identifier and a group identifier. The group-based communication apparatus 205 may receive, from a client device 108A, the user identifier and the group identifier via communications circuitry 208. In one embodiment, the user identifier and group identifier are received upon a user login to a software application of the group-based communication system.

In some embodiments, a user identifier includes one or more items of data by which a user and this user's corresponding user profile may be identified within a group-based communication system. For example, a user identifier may comprise ASCII text, a pointer, a memory address, or other unique identifier.

In some embodiments, a group identifier includes one or more items of data by which a group within a group-based communication system may be identified. For example, a group identifier may comprise ASCII text, a pointer, a memory address, and the like. Group identifiers are used to distinguish group-based communication channels, messages, files, members, etc., associated with one group-based communication workspace from another group-based communication workspace.

At Block 320, the group-based communication apparatus 205 accesses a group-defined graphical object set based on the group identifier. For example, the group-based communication apparatus may retrieve, via group-based communication circuitry 210, an array of graphical object identifiers associated with a group-defined graphical object set from a group-based communication repository 206 associated with the group identifier.

In some embodiments, a group-defined graphical object set includes a plurality of graphical objects (i.e., graphical object identifiers) that are defined within a group-based communication system for a particular group-based communication workspace and made available to users of the group-based communication workspace. For example, a group-defined graphical object set may be a set of emojis that are selected by an administrator of a group-based communication workspace for use by users of the group-based communication workspace. In an embodiment, users of the group-based communication workspace may upload custom graphical objects (e.g., graphical objects designed and created by a user) for inclusion in a group-based graphical object set. Each graphical object of a group-defined graphical object set is associated with a group-identifier in a group-based communication repository of the group-based communication system. In this way, the group-based communication system may readily query the group-based communication repository to identify the group-defined graphical object set when performing ranking operations and/or when rendering graphical objects to a graphical object selection interface.

At Block 330, the group-based communication apparatus 205 accesses user graphical object data based on the user identifier. For example, the group-based communication apparatus 205 may retrieve, via group-based communication circuitry 210, user graphical object data from a group-based communication repository 206.

In some embodiments, a user graphical object data can include collected data associated with graphical object used by a user. User graphical object data is collected by the group-based communication apparatus and can be stored in a group-based communication repository. The collection and storage of user graphical object data can be performed over a period of time, such as elapsed time since a user profile associated with the user was created or activated. At least one messaging communication previously transmitted to the group-based communication server and rendered within a group-based communication interface including or associated with at least one graphical identifier may be stored in the user graphical object data. The user graphical object data comprises data associated with graphic reaction identifiers within message metadata of prior messaging communications transmitted to a group-based communication server by the user. In some embodiments, user graphical object data can comprise one or more sets of graphical objects, such as a user-preferred graphical object set. The user graphical object data is used to determine a user-associated ranking of a group-defined graphical object set.

At Block 340, the group-based communication apparatus 205 determines a user-associated ranking for the group-defined graphical object set based on the user graphical object data. For example, the group-based communication apparatus 205 may determine a user associated ranking for the group-defined graphical object set by determining one or more scores for each graphical object (e.g., graphical object identifier) in the group-defined graphical object set. In this regard, the group-based communication apparatus 205 may determine a graphical object score for each graphical object in the group-defined graphical object set.

In some embodiments, a user-associated ranking can include the determination by a group-based communication apparatus of at least one score for each graphical object within a group-based graphical object set based on user graphical object data. In an embodiment, each graphical object within a group-based graphical object set may comprise a graphical object score. In some embodiments, the user-associated ranking is further based on message metadata, one or more user identifiers, one or more role identifiers, and/or at least one text object associated with a messaging communication. The user-associated ranking is used by the group-based communication apparatus to determine at least one suggested graphical object.

The graphical object score can include data comprising a numerical value (e.g., an integer, floating-point, etc.) determined by the group-based communication apparatus to be associated with a particular graphical object in a group-defined graphical object set. In embodiments, the graphical object score represents a likelihood that a particular user will select the associated graphical object for use in altering a particular message within a group-based communication system. The graphical object score of each graphical object in a group-defined graphical object set is used in the determination of a user-associated ranking for the group-based graphical object set. In an embodiment, the graphical object score of a graphical object may comprise a sum of scores associated with the graphical object.

In embodiments, additional scores may be determined for each graphical object in the group-defined graphical object set and may be used to increment and/or decrement the graphical object score for a particular graphical object in the group-defined graphical object set. The additional scores may be based on a variety of data associated with the user graphical object data. In an embodiment, at least one score is based on user graphical object data associated with a user use frequency associated with each graphical object in the group-defined graphical object set. At least one messaging communication associated with (i) the user identifier and (ii) at least one graphical identifier (i.e., messaging communications in which a user has included a graphical object) may be stored in the user graphical object data. In this regard, the group-based communication apparatus may be configured to determine a use frequency score for the at least one graphical object in the group-defined graphical object set based on the user use frequency (e.g., a value representing the number of appearances of the graphical identifier in the message metadata of the at least one messaging communication) of the graphical object identifier associated with the graphical object in one or more messaging communications stored in the user graphical object data. In this regard, the group-based apparatus 205 may be configured to increment or decrement a graphical object score associated with a graphical object in the group-defined graphical object set based on at least a use frequency score of the graphical object.

In some embodiments, a use frequency score includes data comprising a numerical value (e.g., an integer, floating-point, etc.) determined by the group-based communication apparatus to be associated with a particular graphical object in a group-defined graphical object set. The determination of a user frequency score may be based on user graphical object data. In embodiments, the user frequency score represents a count of times a particular graphical object identifier has been used in prior messaging communications by a particular user.

In an embodiment, the group-based communication apparatus may be configured to determine a user-preferred score for at least one graphical object in a group-defined graphical object set based on user graphical object data associated with a user-preferred graphical identifier associated with selected graphical objects in the group-defined graphical object set. For example, user-preferred graphical identifiers may be assigned to graphical objects a user wishes to designate as "favorite" graphical objects (e.g., graphical objects the user prefers most out of all of the graphical objects in the group-based graphical object set). In an embodiment, one or more graphical objects may be selected (e.g., "favorited" by the user) to be assigned a user-preferred graphical identifier by the user at a client device.

In some embodiments, a user-preferred graphical identifier includes one or more items of data by which a preferred graphical object within a group-based graphical object set may be identified. The preferred graphical object is associated with a user identified as having a preference therefor. For example, a user-preferred graphical identifier may comprise ASCII text, a pointer, a memory address, and the like. User-preferred graphical identifiers are used to distinguish selected graphical objects in a group-based graphical object set.

In some embodiments, a user-preferred graphical object set includes a set of graphical objects (i.e., graphical object identifiers) that are each associated with a common user-preferred graphical identifier. The user-preferred graphical object set may be stored in and associated with a user profile. In an embodiment, one or more graphical object identifiers associated with a user-preferred graphical identifier may be stored as a data structure, such as an array, in association with a user profile and/or user graphical object data.

The group-based communication apparatus 205 may be configured to determine, via graphical object suggestion circuitry 215, a user-preferred score for at least one graphical object in a group-based graphical object set based on a user-preferred graphical object set. In some embodiments, the user profile associated with the user identifier and/or the user graphical object data may comprise a data structure, such as an array, comprising one or more graphical object identifiers associated with a user-preferred graphical identifier (e.g., a user-preferred graphical object set). In this regard, a user-preferred score associated with a graphical object in a group-based graphical object set may be determined in an instance in which the graphical object identifier associated with the graphical object is determined to match at least one graphical object identifier in the user-preferred graphical object set (i.e., comprise a user-preferred graphical identifier).

The group-based apparatus 205 may be configured to increment or decrement a graphical object score associated with a graphical object in the group-defined graphical object set based on at least a user-preferred score of the graphical object.

The user-preferred score can include data comprising a numerical value (e.g., an integer, floating-point, etc.) determined by the group-based communication apparatus to be associated with a particular graphical object in a group-defined graphical object set. The determination of a user-preferred score may be based on a user-preferred graphical object set. In embodiments, a user-preferred score represents an increased likelihood that a particular user will selected the associated graphical object for use in altering a particular message within a group-based communication system because the associated graphical object is associated with a user-preferred graphical object set associated with the particular user.

In an embodiment, determining the user-associated ranking for the group-defined graphical object set may be based on the user graphical object data and a role identifier associated with the user identifier. In this regard, the group-based communication apparatus 205 may be configured to access a role identifier from a user profile associated with the user identifier.

The group-based communication apparatus 205 may further be configured to determine the user-associated ranking for the group-defined graphical object set based on the user graphical object data and the role identifier. For example, group-based communication apparatus may be configured to, via graphical object suggestion circuitry 215, increment or decrement a graphical object score of at least one graphical object in the group-based graphical object set based on the role identifier. In one embodiment, the group-based communication channel may comprise users associated with a particular company or commercial organization, and the user may be associated with a role identifier indicating the user is an accountant. Based on the role identifier, the graphical object score of at least one graphical object in the group-based graphical object set may be incremented or decremented. In the case of the role identifier indicating that the user is an accountant, the graphical object scores of graphical objects in the group-based graphical object set comprising keyword sets associated with accounting topics (e.g., dollar signs) may be incremented by a predefined value.

In some embodiments, a role identifier includes one or more items of data by which a role of a user may be identified and is associated with a user profile. A role of a user may refer to the status of the user within the group-based communication channel, the company associated with the user or group, or other type of role. For example, a group-based communication channel comprising users associated with a particular commercial organization may comprise users with roles such as "employee", "associate", "client", "supervisor", and the like. For example, a role identifier may comprise ASCII text, a pointer, a memory address, or other unique identifier.

At Block 350, the group-based communication apparatus 205 receives, via input/output circuitry 203, a graphical object interface request. In some embodiments, a graphical object interface request includes a demand or instruction created by a client device upon user engagement with a graphical object interface request element. The graphical object interface request includes a user identifier associated with the user who initiated the graphical object interface request and message metadata and body content data of a messaging communication associated with the graphical object interface request and is configured to trigger the group-based communication apparatus to determine at least one suggested graphical object for rendering to a graphical object selection interface. A graphical object selection interface can include a modal, window, menu, pane, or other graphical user interface element that is configured to enable user selection of a graphical object for inclusion in or association with a messaging communication. In various embodiments discussed herein, the group-based communication apparatus is configured to render one or more suggested graphical objects to a graphical object selection interface.

In some embodiments, the group-based communication apparatus 205 may determine whether the graphical object interface request is associated with a draft messaging communication or a published, or posted (i.e., transmitted to the group-based communication server and rendered within a group-based communication interface), messaging communication. In this regard, the group-based communication apparatus 205 may be configured to access a messaging communication associated with the graphical object interface request.

In some embodiments, a draft messaging communication includes any electronically generated digital content object provided by a user using a client device and that is configured for display within a group-based communication channel interface associated with a group-based communication channel, but which has not yet been transmitted to a group-based communication server for rendering within the group-based communication interface associated with the group-based communication channel. Draft message communications may include any text, image, video, audio or combination thereof provided by a user (using a client device). For instance, the user may provide a draft messaging communication that includes text as well as an image and a video within the messaging communication as message contents. In such a case, the text, image, and video would comprise the draft messaging communication. Each draft messaging communication that is configured for transmitting to a group-based communication system in order to be "posted" (i.e., be rendered for display) within a group-based communication interface associated with a group-based communication channel of the group-based communication system includes message metadata comprising the following: a sending user identifier, a message identifier, a group identifier, a group-based communication channel identifier, and a published identifier indicating that the draft messaging communication has not yet been transmitted to the group-based communication server.

In some embodiments, a published identifier includes a flag associated with a draft messaging communication that represents whether the draft messaging communication has been transmitted to a group-based communication server or not. In embodiments, the published identifier may comprise a single bit (e.g., a 0 or a 1). In one embodiment, the published identifier may comprise a Boolean value with an assignment of "0" indicating a draft messaging communication state and a "1" indicating published or posted messaging communication state. Each of the identifiers associated with a draft messaging communication may comprise ASCII text, a pointer, a memory address, and the like. In addition to message metadata, draft messaging communications also include draft body content data that comprises text, an image, a file, video, or the like.

The group-based communication apparatus 205 may be further configured to access a published identifier associated with the message metadata of the messaging communication. In one embodiment, the published identifier may comprise a Boolean value with an assignment of "0" indicating the messaging communication associated with the graphical object interface request is in a draft messaging communication state and a "1" indicating the messaging communication associated with the graphical object interface request is in a published, or posted, messaging communication state.

At Block 360, the group-based communication apparatus 205, via the graphical object suggestion circuitry 215, determines at least one suggested graphical object based on the user-associated ranking. The group-based communication apparatus 205 may determine at least one suggested graphical object based on the user-associated ranking in response to receiving the graphical object interface request.

At Block 370, the group-based communication apparatus 205 causes rendering of the at least one suggested graphical object to a graphical object selection interface. In this regard, the group-based communication apparatus 205 may transmit data associated with at least one suggested graphical object to a client device 108A and cause rendering, to a display of the client device, of the at least one suggested graphical object within a graphical object selection interface of the group-based communication interface 300. Operations of Blocks 360 and 370 are further discussed in detail herein.

Figure 3B:
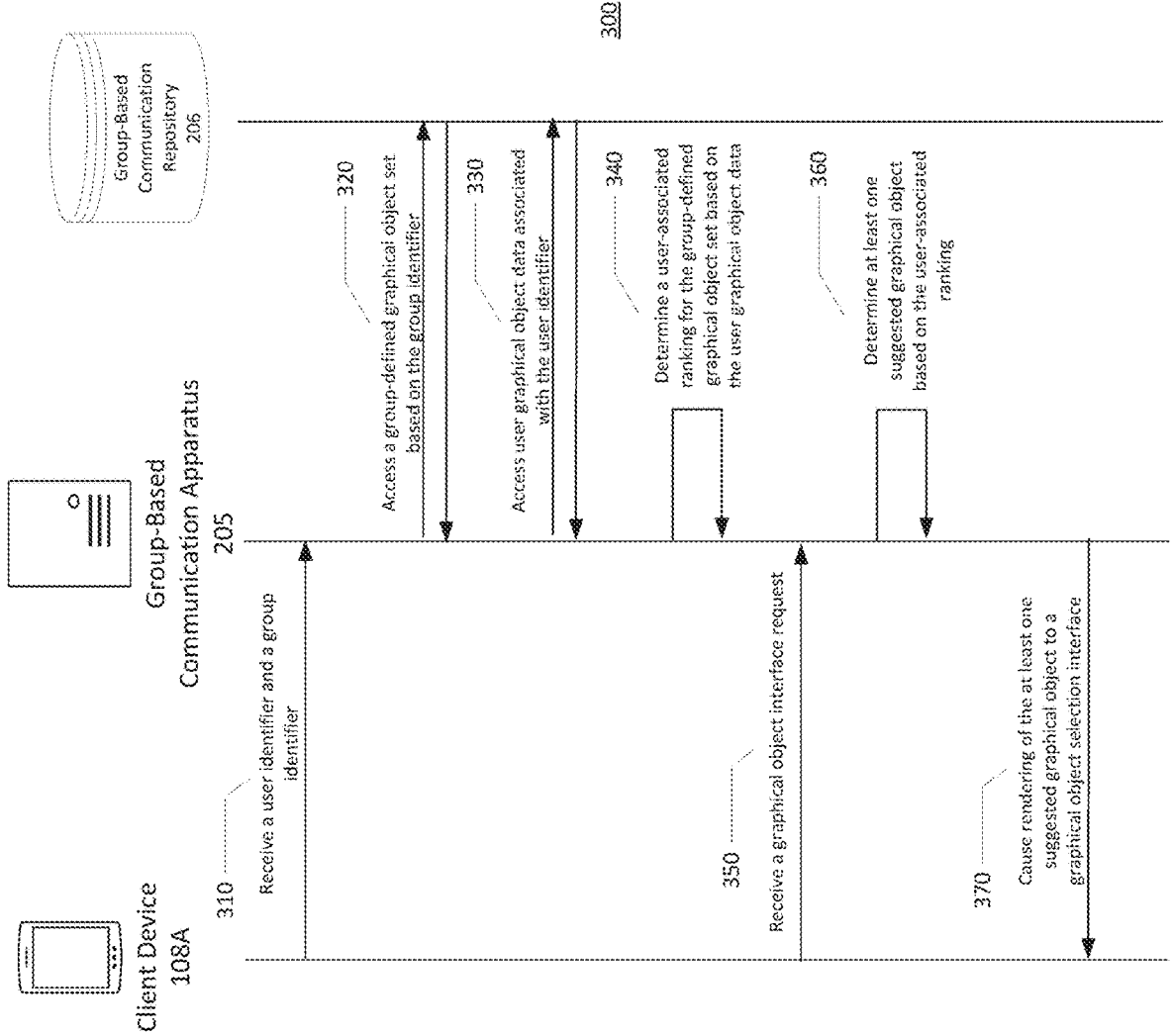
FIG. 3B is a signal diagram of an example data flow in accordance with one embodiment.

FIG. 3B is a signal diagram of an example data flow represented by method 300. Method 300 is described as being performed by a client device 108A, a group-based communication apparatus 205, and a group-based communication repository 206. These may be similar to those previously discussed with regards to FIG. 1.

Figure 4A:
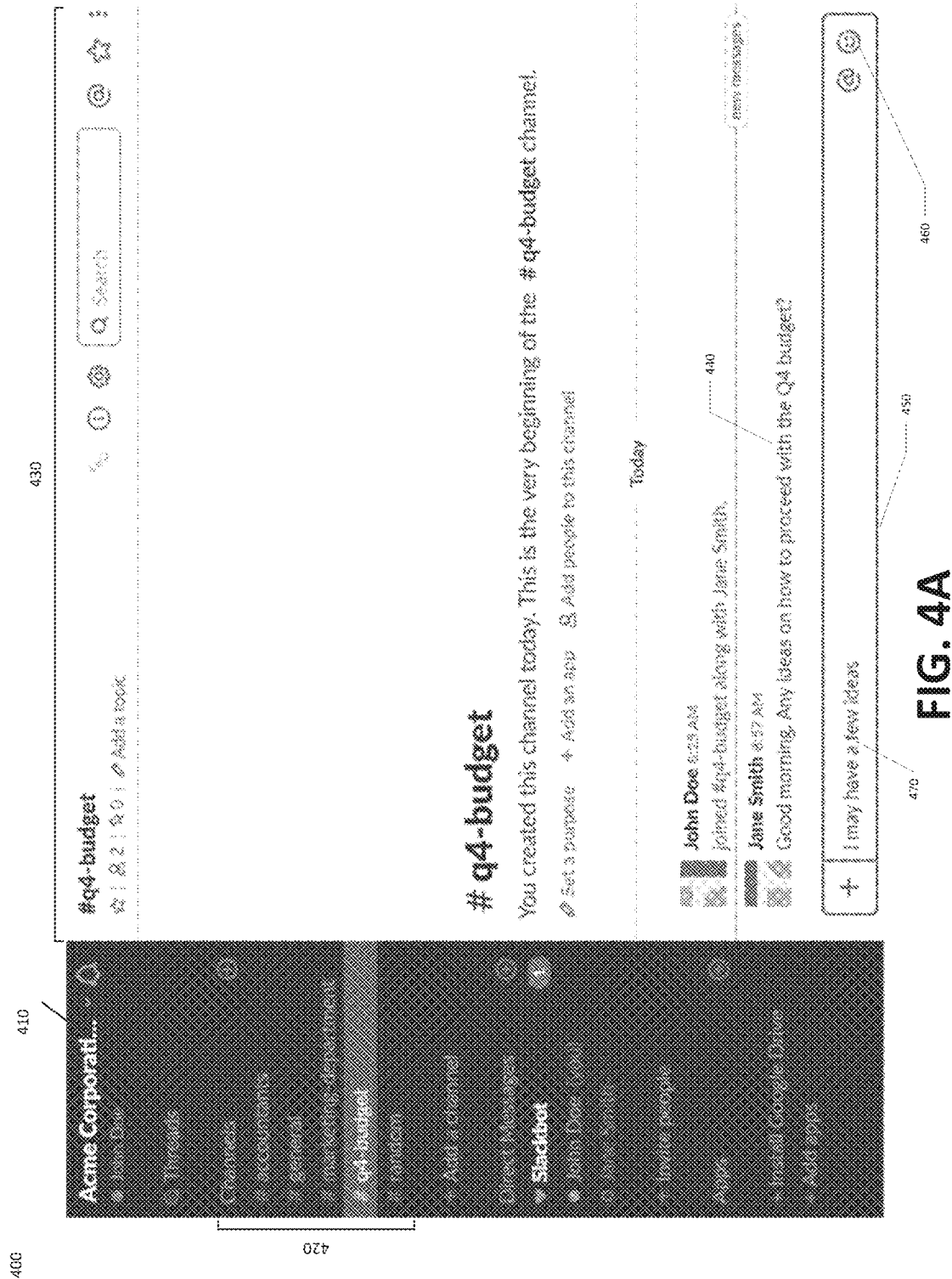
FIG. 4A shows an example group-based communication interface configured in accordance with one embodiment.
Figure 4B:
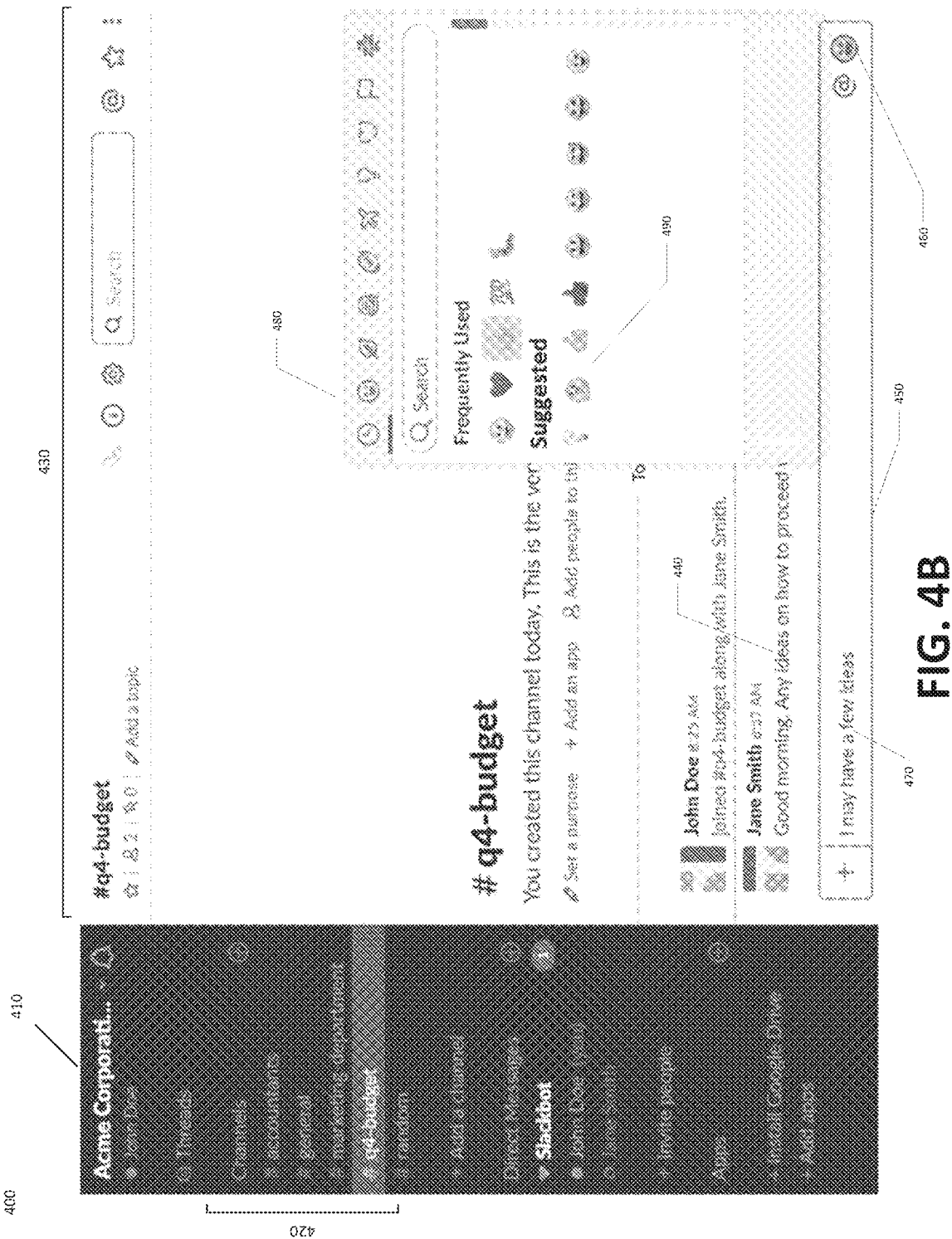
FIG. 4B shows an example group-based communication interface configured in accordance with one embodiment.

FIGS. 4A and 4B depict an example group-based communication interface 400 structured in accordance with various embodiments of the invention. The depicted group-based communication interface 400 comprises a sidebar pane 410 and a message pane 430. The sidebar pane 410 includes a permitted group-based communication channel set 420 arranged vertically as shown. The depicted permitted group-based communication channel set 420 is arranged (e.g., alphabetically) in the sidebar pane 410 based on respective channel identifiers. The depicted permitted group-based communication channel set 420 includes those private group-based communication channels and public group-based communication channels to which the user accessing the depicted group-based communication interface 400 has been granted access by the group-based communication system.

Each channel identifier of the permitted group-based communication channel set 420 represents a user-engageable link configured for accessing group-based communication objects (e.g., messaging communications, files, etc.) associated with respective group-based communication channels. Once a user clicks on, engages, touches, or otherwise selects a channel identifier link, any messaging communications associated with the selected group-based communication channel are rendered to the message pane 430. In the depicted embodiment, a channel identifier link "# q4-budget" is selected and messages associated with the selected group-based communication channel "# q4-budget" are rendered to the message pane 430. Other group-based communication objects (e.g., files, images, apps, etc.) are accessible through the message pane 430 or links embedded within the message pane 430.

The message pane 430 may comprise at least one messaging communication 440. In the depicted embodiment, messaging communication 440 is a messaging communication that has been transmitted to the group-based communication server and rendered within a group-based communication interface associated with the group-based communication channel by a user, "Jane Smith", for other users associated with the group-based communication channel to view and/or interact with. The messaging communication 440 may comprise a published identifier indicating that the messaging communication has been rendered within message pane 430 of group-based communication interface 400.

The group-based communication interface 400 may also include a messaging communication input element 450. A user may input data (e.g., text, emojis, links, hashtags, etc.) in the form of a draft messaging communication 470 into the messaging communication input element 450. The user may transmit the draft messaging communication 470 to the group-based communication server for rendering within the group-based communication interface associated with the group-based communication channel by providing user engagement to the messaging communication input element 450. For example, the user may transmit the draft messaging communication 470 to the group-based communication server by providing a predefined keystroke engagement (e.g., pressing a 'return' key) while interacting with the messaging communication input element 450 and in doing so generate a messaging communication provision request. In some embodiments, the user may transmit the draft messaging communication 470 to the group-based communication server by selecting (e.g., by touch, mouse-click, and/or the like) an interface element associated with generating a messaging communication provision request (e.g., a 'send' button and/or the like). Once a messaging communication is transmitted to the group-based communication server, it is rendered to message pane 430 of the group-based communication interface 400 and a published identifier comprising a Boolean value associated with the messaging communication may be assigned a '1' indicating the messaging communication is in a published state.

Figure 5A:
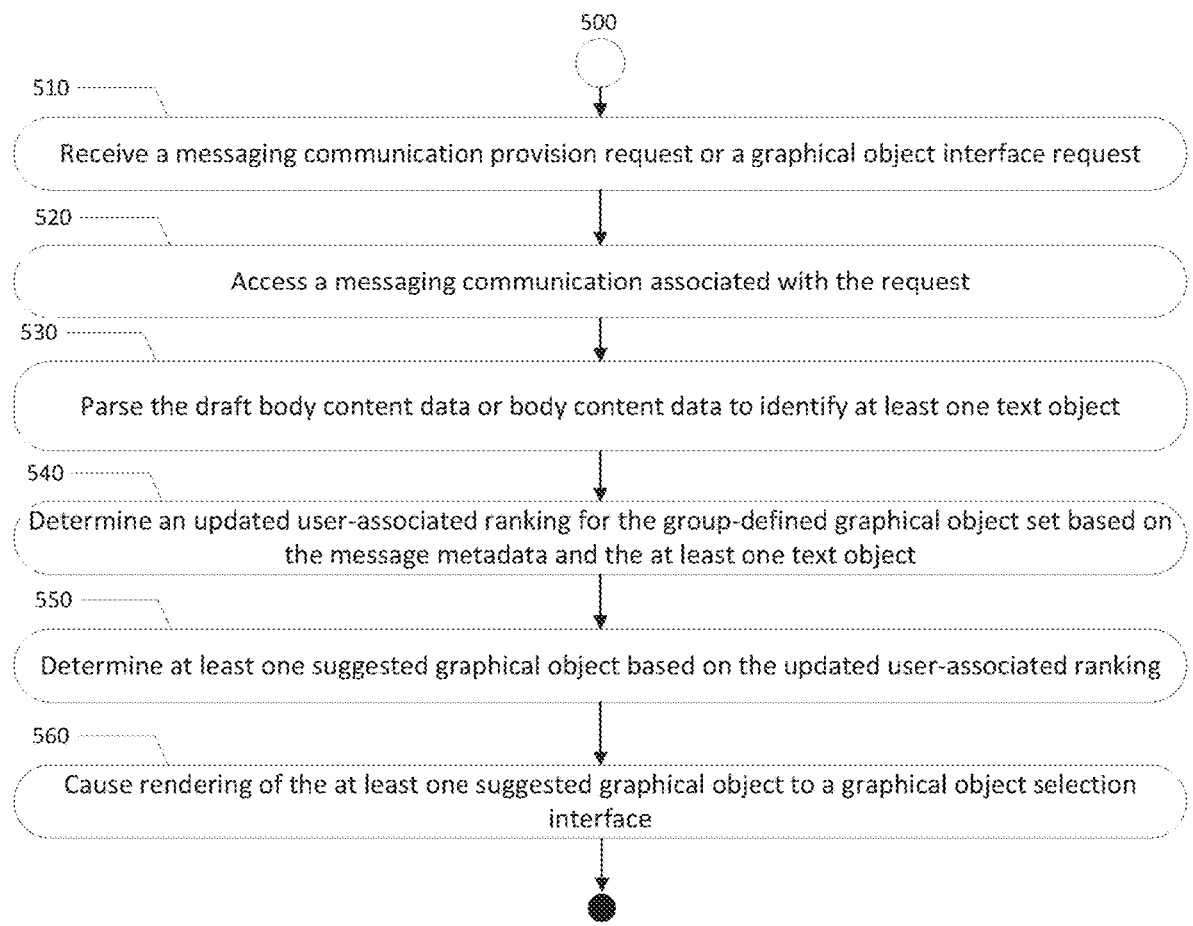
FIG. 5A is a flowchart illustrating example steps for determining an updated user-associated ranking for a group-defined graphical object set and determining at least one suggested graphical object based on the updated user-associated ranking configured in accordance with one embodiment.

The group-based communication interface 400 and/or the messaging communication input element 450 may further comprise one or more graphical object interface request elements 460. In certain embodiments, user selection (e.g. touch, mouse-click, etc.) of the graphical object interface request element 460 generates a graphical object interface request. Additionally or alternatively, a predefined keystroke engagement may be provided during interaction with the messaging communication input element 450, such as by the user "John Doe" thus generating a messaging communication provision request. In association with the messaging communication provision request or the graphical object interface request, the group-based communication apparatus may then carry out the operations of FIG. 5A.

The depicted method 500 begins at Block 510 where the group-based communication apparatus 205 receives a messaging communication provision request or a graphical object interface request. For example, the group-based communication apparatus 205 may receive the messaging communication provision request or graphical object interface request via input/output circuitry 203 in response to generation of the messaging communication provision request or graphical object interface request by the user at a client device 108A-N.

A messaging communication provision request can include a demand or instruction created by a client device upon user engagement with a group-based communication interface element or messaging communication input element to post a draft messaging communication (i.e., transmit the draft messaging communication to the group-based communication server and to render within a message pane of a group-based communication interface, thereby converting a draft messaging communication to a messaging communication). The transmission of the draft messaging communication to the group-based communication server changes the state of the messaging communication from a draft state to a published state by changing the published identifier associated with the messaging communication. The messaging communication provision request includes a user identifier associated with the user who initiated the messaging communication provision request. In some embodiments, the messaging communication provision request also includes message metadata and body content data associated with a messaging communication draft. In an embodiment, the messaging communication provision request is created by a client device upon user engagement associated with a predefined keystroke (e.g., pressing a return key).

At Block 520, the group-based communication apparatus accesses a messaging communication associated with the request. In this regard, the group-based communication apparatus may be configured to access a draft messaging communication 470 associated with a messaging communication provision request. Similarly, the group-based communication apparatus may be configured to access a draft messaging communication 470 associated with a graphical object interface request, such as the graphical object interface request generated from user engagement with the graphical object interface element 460.

In the depicted embodiment of FIGS. 4A and 4B, the draft messaging communication 470 associated with the messaging communication provision request comprises draft body content data comprising the text "I may have a few ideas." By accessing the draft messaging communication 470, the group-based communication apparatus 205 accesses message metadata and draft body content data associated with the draft messaging communication 470.

In some embodiments, body content data comprises digital content contained within a messaging communication. Body content data can include text, images, files, video, graphical objects (e.g., graphical object identifiers), and the like. Body content data is parsed to determine context, topics, text snippets, and the like associated with a messaging communication, such as one or more text objects. Further, draft body content data comprises digital content contained within a draft messaging communication. Draft body content data can include text, images, files, video, graphical objects (e.g., graphical object identifiers), and the like. Draft body content data is parsed to determine context, topics, text snippets, and the like associated with a draft messaging communication, such as one or more text objects.

At Block 530, the group-based communication apparatus 205 may parse the draft body content data of the draft messaging communication 470 to identify at least one text object. In the depicted embodiment of FIGS. 4A and 4B, the group-based communication apparatus 205 may identify a text object comprising the text "ideas" from the draft messaging communication 470 and, similarly, identify additional text objects comprising the text of each word in the draft messaging communication 470. In some embodiments, identified text objects may comprise a phrase (i.e., multiple words separated by space characters). The group-based communication apparatus 205 may temporarily store the text objects identified from the draft body content data in memory 204 in order to carry out further operations associated with the draft messaging communication 470.

At Block 540, the group-based communication apparatus 205 determines an updated user-associated ranking for the group-defined graphical object set based on the message metadata and the at least one text object. In this regard, the group-based communication apparatus 205 may be configured to determine, via graphical object suggestion circuitry 215, a topic-defined graphical object set by comparing the at least one text object to a respective keyword set associated with each graphical object of the group-defined graphical object set. For example, the group-based communication apparatus 205 may compare the text object comprising the text "ideas" to a respective keyword set associated with each graphical object of the group-defined graphical object set. If one or more of the keyword sets comprise a text object comprising text matching "ideas", the graphical object identifier associated with the respective keyword set may be included in the topic-defined graphical object set.

In some embodiments, a topic-defined graphical object set includes a plurality of graphical object identifiers associated with graphical objects comprising at least one common text object in its keyword set. For example, a topic-defined graphical object set may be a set of emojis comprising the text object "accounting" in their respective keyword sets. Each graphical object of a topic-defined graphical object set is associated with a group-identifier in a group-based communication repository of the group-based communication system. In this way, the group-based communication system may readily query the group-based communication repository to identify the topic-defined graphical object set when performing ranking operations and/or when rendering graphical objects to a graphical object selection interface.

Graphical objects in the group-defined graphical object set that are also included in the topic-defined graphical object set may comprise a message relevance score indicative of being more closely related to a messaging communication or a draft messaging communication 470. In this regard, the group-based communication apparatus 205 is configured to determine a message relevance score for each graphical object (e.g., graphical object identifier) in the group-defined graphical object set and further, the group-based communication apparatus 205 may be configured to determine an updated user-associated ranking for the group-defined graphical object set based on the message metadata and the topic-defined graphical object set. For example, the group-based communication apparatus 205 may be configured to increment or decrement a graphical object score associated with a graphical object in a group-defined graphical object set based on a message relevance score associated with the graphical object.

In some embodiments, the message relevance score can include data comprising a numerical value (e.g., an integer, floating-point, etc.) determined by the group-based communication apparatus to be associated with a particular graphical object in a group-defined graphical object set. The determination of a message relevance score may be based on a topic-defined graphical object set. In embodiments, the message relevance score represents a likelihood that the associated graphical object is associated with, relevant to, or the like to body content of a group-based communication message.

One or more identifiers or items of data within the message metadata may be used to determine or update a user-associated ranking. For example, the graphical object score associated with each graphical object in a group-based graphical object set may be incremented or decremented based on one or more identifiers in the message metadata such as a sending user identifier, group identifier, group-based communication channel identifier, and/or the like. In an embodiment, a timestamp associated with the message metadata may be used to increment or decrement a graphical object score of one or more graphical objects of a group-defined graphical object set.

In some embodiments, a sending user identifier is associated with a collection of messaging communications that are sent by a particular user (e.g., sent by a client device associated with the particular user, user identifier, or user profile). These messaging communications may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like.

At Block 550, the group-based communication apparatus 205 determines at least one suggested graphical object based on the updated user-associated ranking for the group-defined graphical object set. In this regard, the group-based communication apparatus 205 may be configured to determine, via graphical object suggestion circuitry 215, at least one suggested graphical object based on the updated user associated ranking for the group-defined graphical object set. Determining suggested graphical objects based on the updated user associated ranking for the group-defined graphical object set may be done in a variety of manners. For example, graphical objects associated with graphical object identifiers found in the topic-defined graphical object set may be determined to be suggested graphical objects.

Additionally, or alternatively, a predefined amount of graphical object identifiers in the group-defined graphical object set may be determined to be suggested graphical objects based on the user-associated ranking (e.g., twenty-five highest scoring graphical objects (i.e., the highest graphical object score) of the group-defined graphical object set may be determined to be suggested graphical objects).

At Block 560, the group-based communication apparatus 205 causes rendering of the at least one suggested graphical object 490 to a graphical object selection interface 480. One or more suggested graphical objects may be rendered to the graphical object selection interface 480 in a predefined order, such as from a graphical object comprising a highest graphical object score value of the group-based graphical object set to a graphical object comprising the lowest graphical object score value of the graphical object set. In an embodiment, suggested graphical objects 490 may be rendered to the graphical object selection interface under subcategories such as "Suggested", "Favorites", and/or the like.

FIG. 5B is a signal diagram of an example data flow represented by method 500. Method 500 is described as being performed by a client device 108A, a group-based communication apparatus 205, and a group-based communication repository 206. These may be similar to those previously discussed with regards to FIG. 1.

Figure 6A:
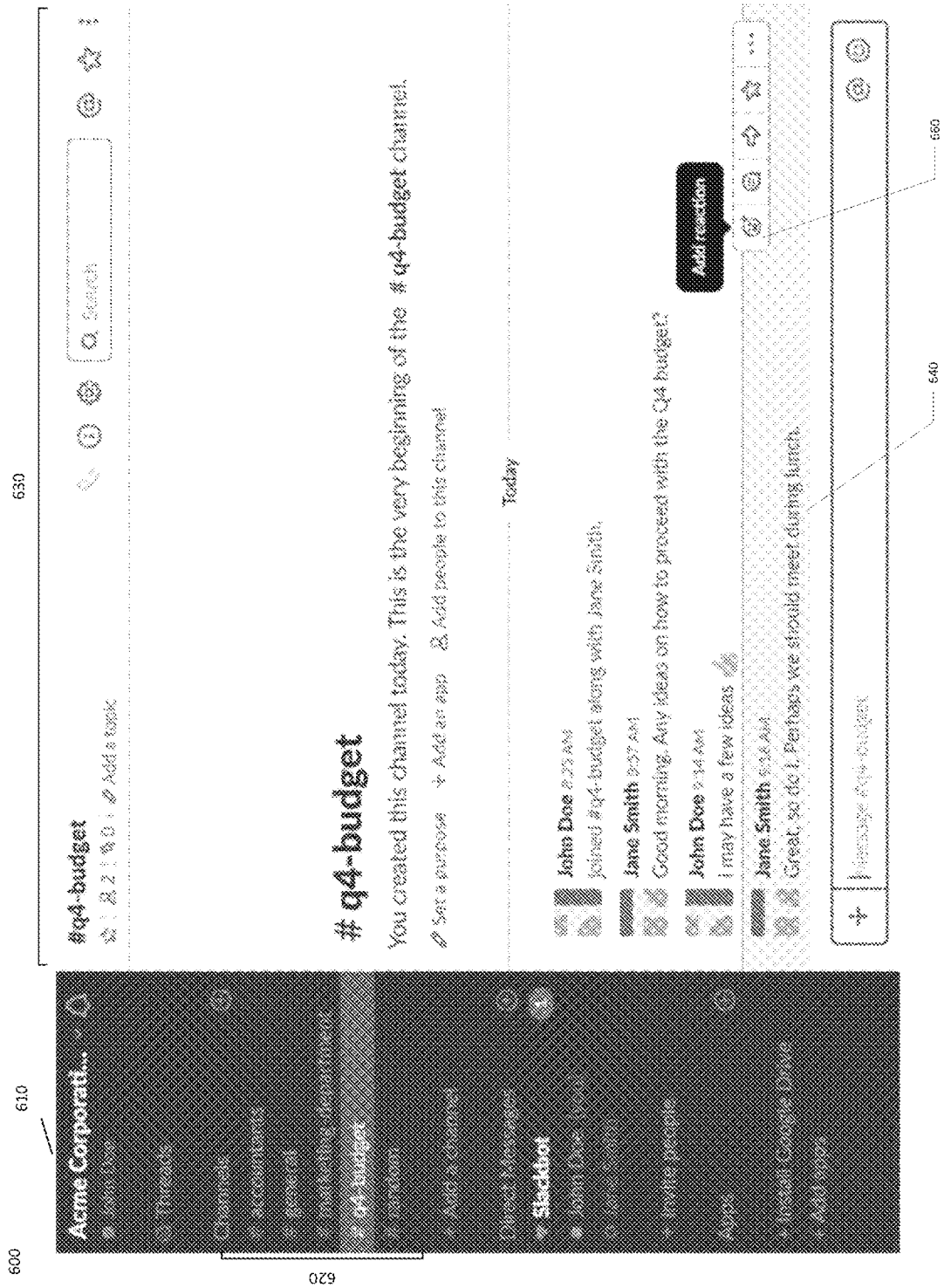
FIG. 6A shows an example group-based communication interface configured in accordance with one embodiment.
Figure 6B:
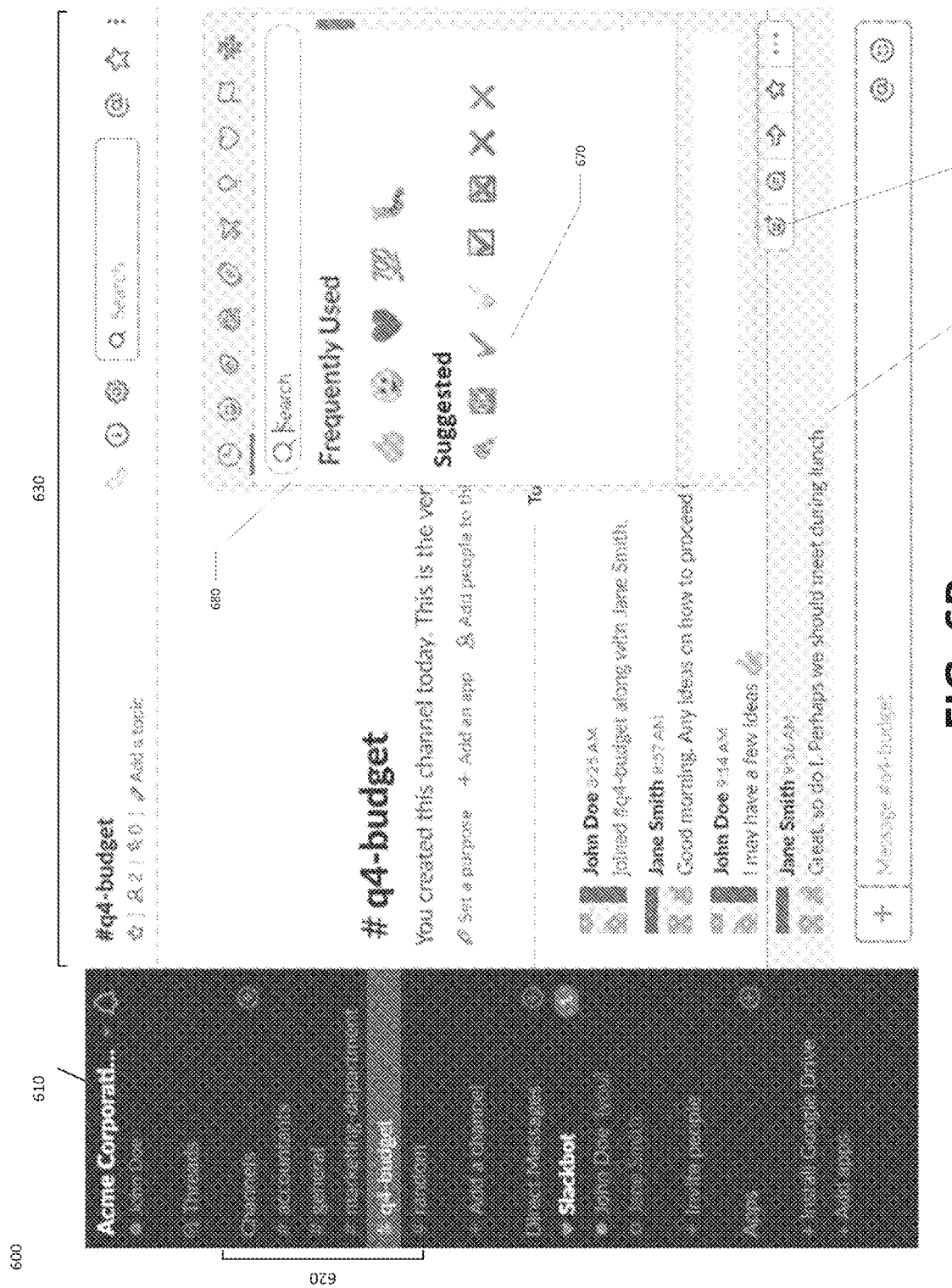
FIG. 6B shows an example group-based communication interface configured in accordance with one embodiment.
Figure 6C:
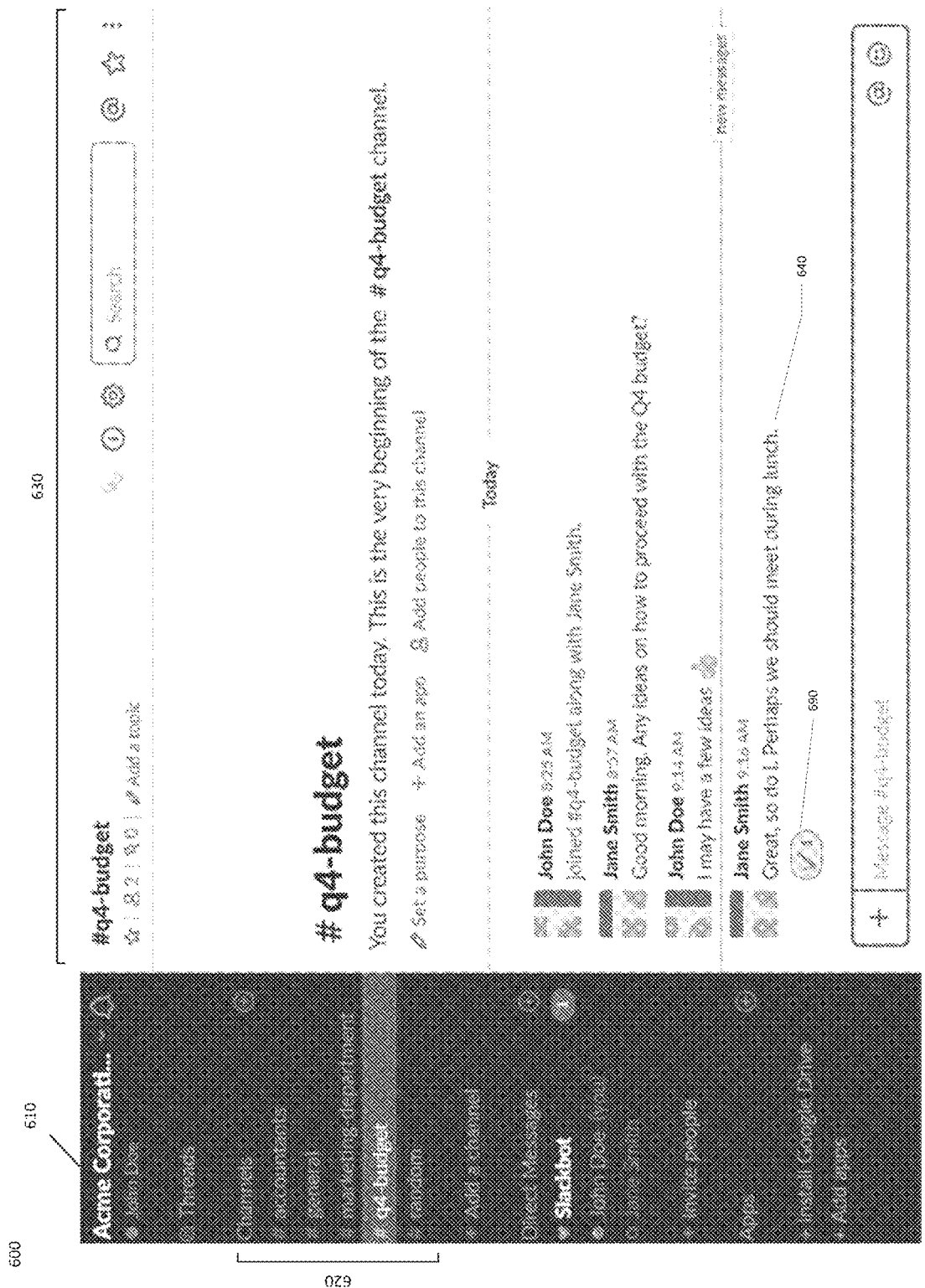
FIG. 6C shows an example group-based communication interface configured in accordance with one embodiment.

FIGS. 6A, 6B, and 6C depict an example group-based communication interface 600, structured similarly to the group-based communication interface 400 illustrated in FIGS. 4A and 4B, in accordance with various embodiments of the invention. Group-based communication interface 600 comprises sidebar pane 610, permitted group-based communication channel set 620, message pane 630, at least one messaging communication 640, and a graphical object request element 660. In the depicted embodiment, the graphical object interface request element 660 is associated with published messaging communication 640. In other words, when a user, such as "John Doe", engages with (e.g., touch, mouse-click, or the like) the graphical object interface request element 660, a client device 108A-N associated with "John Doe" may generate a graphical object interface request comprising message metadata and body content data of the messaging communication 640.

In the depicted embodiment, user "John Doe" may engage with the graphical object interface request element 660 in an effort to "react" to the messaging communication 640 posted (i.e., rendered within message pane 630 of group-based communication interface 600) by Jane Smith. In other words, "reacting" to messaging communication 640 may comprise selecting a suggested graphical object 670 from a graphical object selection interface 680. The result of the selection of a suggested graphical object 670 from graphical object selection interface 680 may be rendering, by the group-based communication apparatus, of the selected graphical object as a reaction 690 associated with the messaging communication 640 to message pane 630. The graphical object representing the reaction 690 may then be viewed by other users of the group-based communication channel 205, who, in some embodiments, may choose to provide their own respective suggested graphical object as a reaction as well.

Figure 7A:
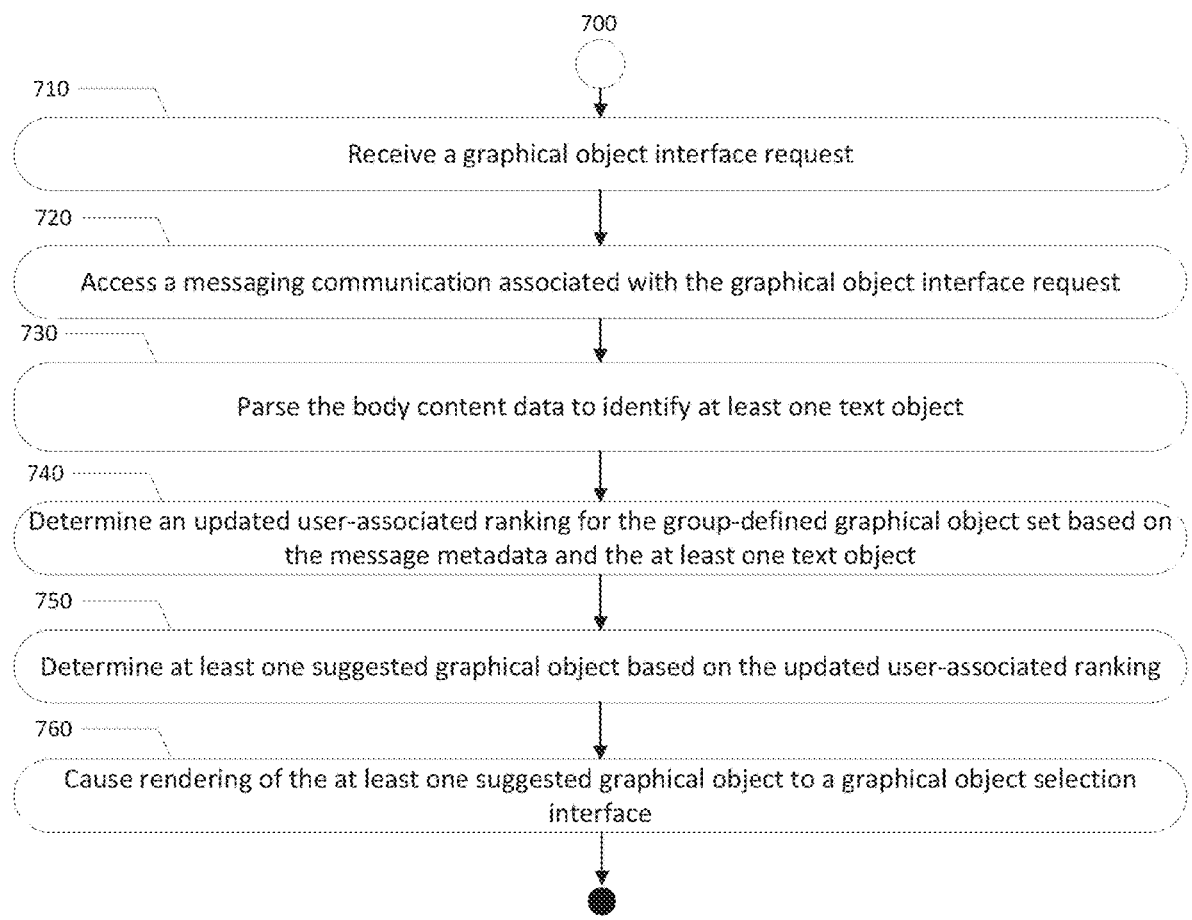
FIG. 7A is a flowchart illustrating example steps for determining an updated user-associated ranking for a group-defined graphical object set and determining at least one suggested graphical object based on the updated user-associated ranking configured in accordance with one embodiment.

In the depicted embodiment, the user of the group-based communication interface 600 engages with (e.g., touch, mouse-click, or the like) the graphical object request element 660 at a client device 108A-N associated with the user and generates a graphical object interface request. In association with the graphical object interface request, the group-based communication apparatus 205 may then carry out the method 700 of FIG. 7A in a similar fashion to method 500 of FIG. 5.

The depicted method 700 begins at Block 710 where the group-based communication apparatus 205 receives, via input/output circuitry 203, a graphical object interface request. The group-based communication apparatus 205 may receive the graphical object interface request from a client device 108A-N in response to generation of the graphical object interface request by the user at the client device 108A-N.

At Block 720, the group-based communication apparatus accesses a messaging communication associated with the request. In this regard, the group-based communication apparatus may be configured to access a messaging communication 640 associated with a graphical object interface request, such as the graphical object interface request generated from user engagement with the graphical object interface element 660. In the depicted embodiment of FIGS. 6A, 6B, and 6C, the messaging communication 640 associated with the graphical object interface request comprises body content data comprising the text "Great, so do I. Perhaps we should meet during lunch." By accessing the messaging communication 640, the group-based communication apparatus 205 accesses message metadata and body content data associated with the messaging communication 640. The group-based communication apparatus may determine that the graphical object interface request is associated with a published messaging communication 640 by accessing a published identifier in the message metadata of the messaging communication.

At Block 730, the group-based communication apparatus 205 may parse the body content data of the messaging communication to identify at least one text object. In the depicted embodiment of FIG. 6A-C, the group-based communication apparatus 205 may identify a text object comprising the text "Perhaps" and a second text object comprising the text "lunch" from the body content data of messaging communication 640 and, similarly, identify additional text objects comprising the text of each word in the messaging communication 640. The group-based communication apparatus 205 may temporarily store the text objects identified from the body content data in memory 204 in order to carry out further operations associated with the messaging communication 640.

At Block 740, similar to Block 540 of method 500, the group-based communication apparatus 205 determines an updated user-associated ranking for the group-defined graphical object set based on the message metadata and the at least one text object. In this regard, the group-based communication apparatus may be configured to determine, via graphical object suggestion circuitry 215, a topic-defined graphical object set by comparing the at least one text object to a keyword set of each graphical object of the group-defined graphical object set. For example, the group-based communication apparatus 205 may compare the text object comprising the text "Perhaps" to a keyword set of each graphical object of the group-defined graphical object set. If one or more of the keyword sets comprise a text object comprising text matching "Perhaps", the graphical object identifier associated with the respective keyword set may be included in the topic-defined graphical object set. Graphical objects in the group-defined graphical object set that are also included in the topic-defined graphical object set may comprise a message relevance score indicative of being more relevant to a messaging communication 640.

At Block 750, the group-based communication apparatus 205 determines at least one suggested graphical object based on the updated user-associated ranking for the group-defined graphical object set. In this regard, the group-based communication apparatus 205 may be configured to determine, via graphical object suggestion circuitry 215, at least one suggested graphical object based on the updated user associated ranking for the group-defined graphical object set.

At Block 760, the group-based communication apparatus 205 causes rendering of the at least one suggested graphical object 670 to a graphical object selection interface 680 in a manner similar to Block 560.

Figure 7B:
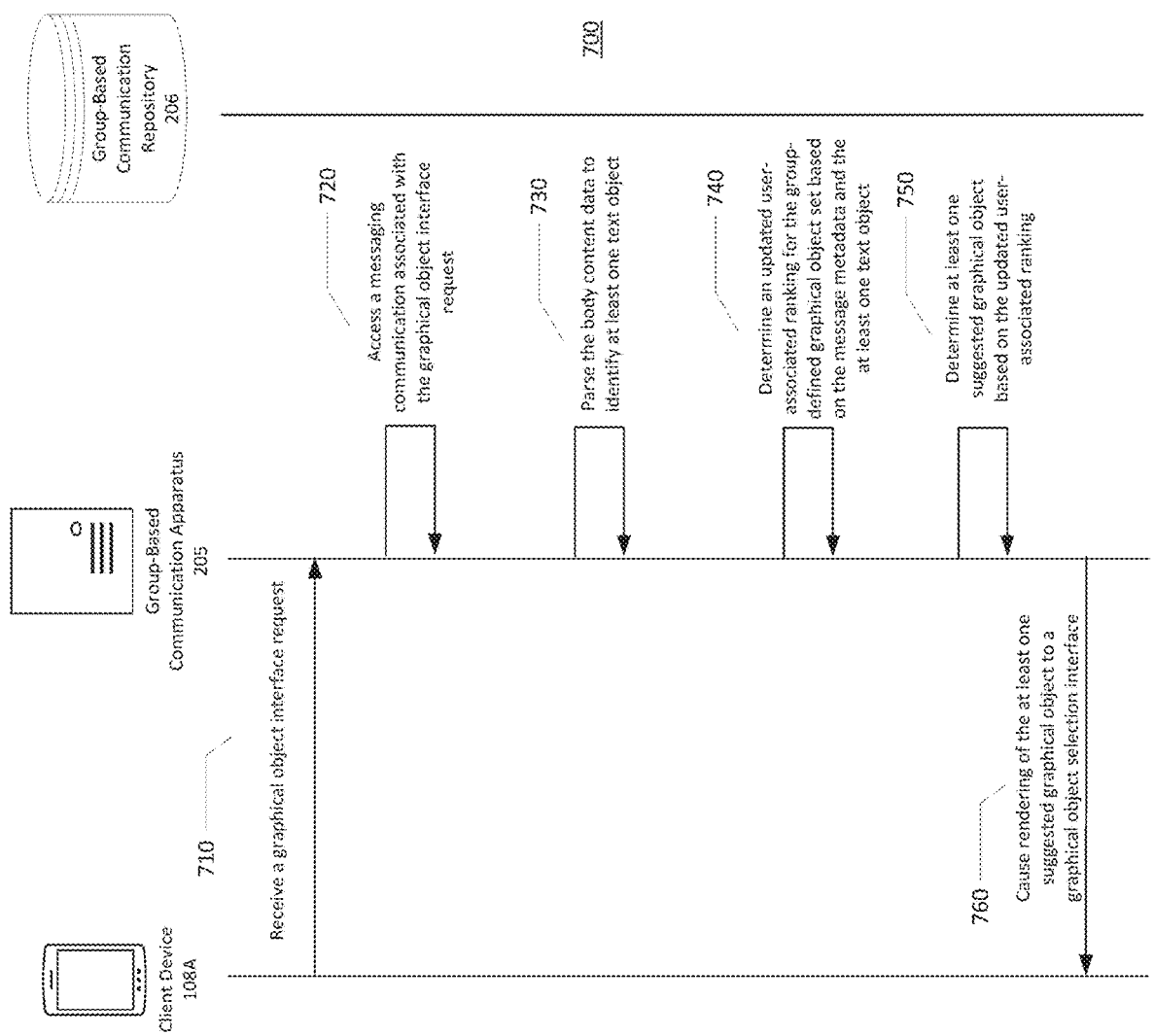
FIG. 7B is a signal diagram of an example data flow in accordance with one embodiment.

FIG. 7B is a signal diagram of an example data flow represented by method 700. Method 700 is described as being performed by a client device 108A, a group-based communication apparatus 205, and a group-based communication repository 206. These may be similar to those previously discussed with regards to FIG. 1.

Figure 8:
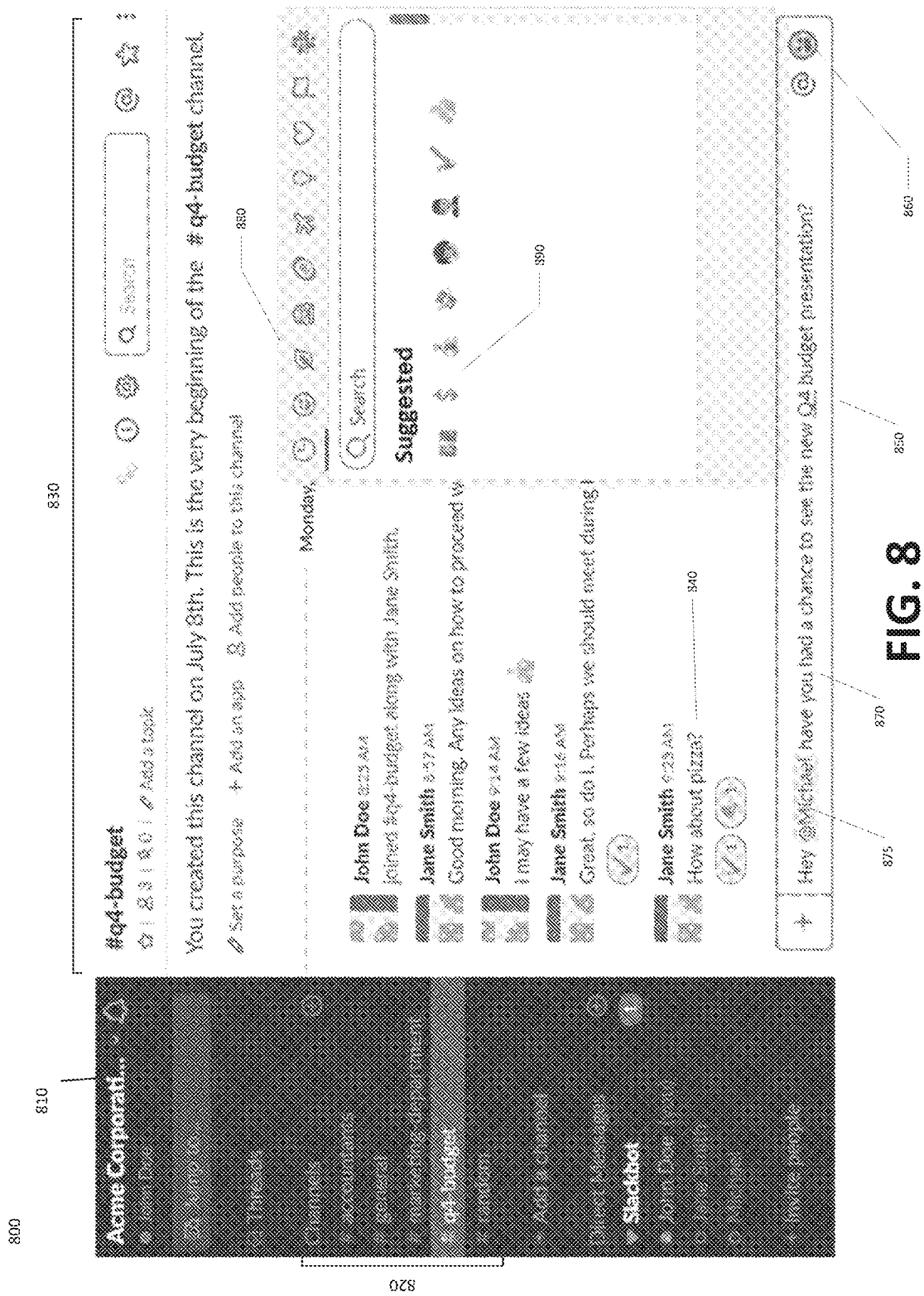
FIG. 8 shows an example group-based communication interface configured in accordance with one embodiment.

FIG. 8 depicts an example group-based communication interface 800 structured similarly to the group-based communication interface 400 illustrated in FIGS. 4A and 4B in accordance with various embodiments of the invention. Group-based communication interface 800 comprises sidebar pane 810, permitted group-based communication channel set 820, message pane 830, at least one published messaging communication 840, a messaging communication input element 850, a graphical object request element 860, and a graphical object selection interface 880 comprising a plurality of suggested graphical objects 890. In the depicted embodiment, the graphical object interface request element 660 is associated with a draft messaging communication 870. In other words, when a user, such as "John Doe", engages with (e.g., touch, mouse-click, or the like) the graphical object interface request element 860, a client device 108A-N associated with "John Doe" may generate a graphical object interface request comprising message metadata and draft body content data of the draft messaging communication 870.

In the depicted embodiment of FIG. 8, a user (e.g., "John Doe") interacting with the group-based communication interface 800 has drafted a draft messaging communication 870 in the messaging communication input element 850. Upon engaging with graphical object interface request element 860, a client device 810A-N may generate a graphical object interface request. Similarly, upon providing keystroke engagement (e.g., pressing the 'return' key) to the messaging communication input element 850, the client device 810A-N associated with the user may generate a messaging communication provision request. In either scenario, method 500 of FIG. 5A may then be carried out by the group-based communication apparatus 205 in a similar fashion as described above.

In the depicted embodiment of FIG. 8, the draft messaging communication 870 comprises text indicative of a second user. In this regard, at Block 530, the group-based communication apparatus may parse the draft body content data of the draft messaging communication 870 to determine at least one text object 875 that is associated with a second user identifier. For example, the group-based communication apparatus may determine at least one text object 875 is associated with a second user identifier in an instance in which the text string of the text object comprises a special symbol (e.g., "@") at the beginning of the text string.

At Block 540, the group-based communication apparatus 205 determines an updated user-associated ranking for the group-defined graphical object set based on the message metadata and the at least one text object. In this regard, the group-based communication apparatus may be configured to determine a topic-defined graphical object set by comparing the at least one text object to a keyword set of each graphical object of the group-defined graphical object set. For example, the group-based communication apparatus 205 may compare the text object comprising the text "budget" to a keyword set of each graphical object of the group-defined graphical object set. If one or more of the keyword sets comprise a text object comprising text matching "budget", the graphical object identifier associated with the respective keyword set may be included in the topic-defined graphical object set.

Graphical objects in the group-defined graphical object set that are also included in the topic-defined graphical object set may comprise a message relevance score indicative of being more closely related to a messaging communication or a draft messaging communication 870. In this regard, the group-based communication apparatus 205 is configured to determine a message relevance score for each graphical object (e.g., graphical object identifier) in the topic-defined graphical object set and further, the group-based communication apparatus 205 may be configured to determine an updated user-associated ranking for the group-defined graphical object set based on the message metadata and the topic-defined graphical object set.

However, in the depicted embodiment of FIG. 8, the group-based communication apparatus 205 may determine an updated user-associated ranking for the group-defined graphical object set based on the message metadata, the at least one text object, and, additionally, the second user identifier. In this regard, the group-based communication apparatus 205 may be configured to increment or decrement the graphical object score of a graphical object in a group-defined graphical object set based on the second user identifier. For example, if the user profile associated with the user identifier associated with the text object "@Michael" comprises a role identifier indicating the user is an accountant, graphical object scores of graphical objects in the group-based graphical object set comprising keyword sets relevant to accounting topics (e.g., "money", "dollar", "accounting", etc.) may be incremented due to a higher relevance to the user associated with the second user identifier. Additionally, or alternatively, the group-based apparatus 205 may be configured to access a user-preferred graphical object set from the user profile associated with the second user identifier. Based on the user-preferred graphical object set associated with the second user identifier, a graphical object score may be incremented or decremented for one or more graphical objects of the group-defined graphical object set.

Figure 9:
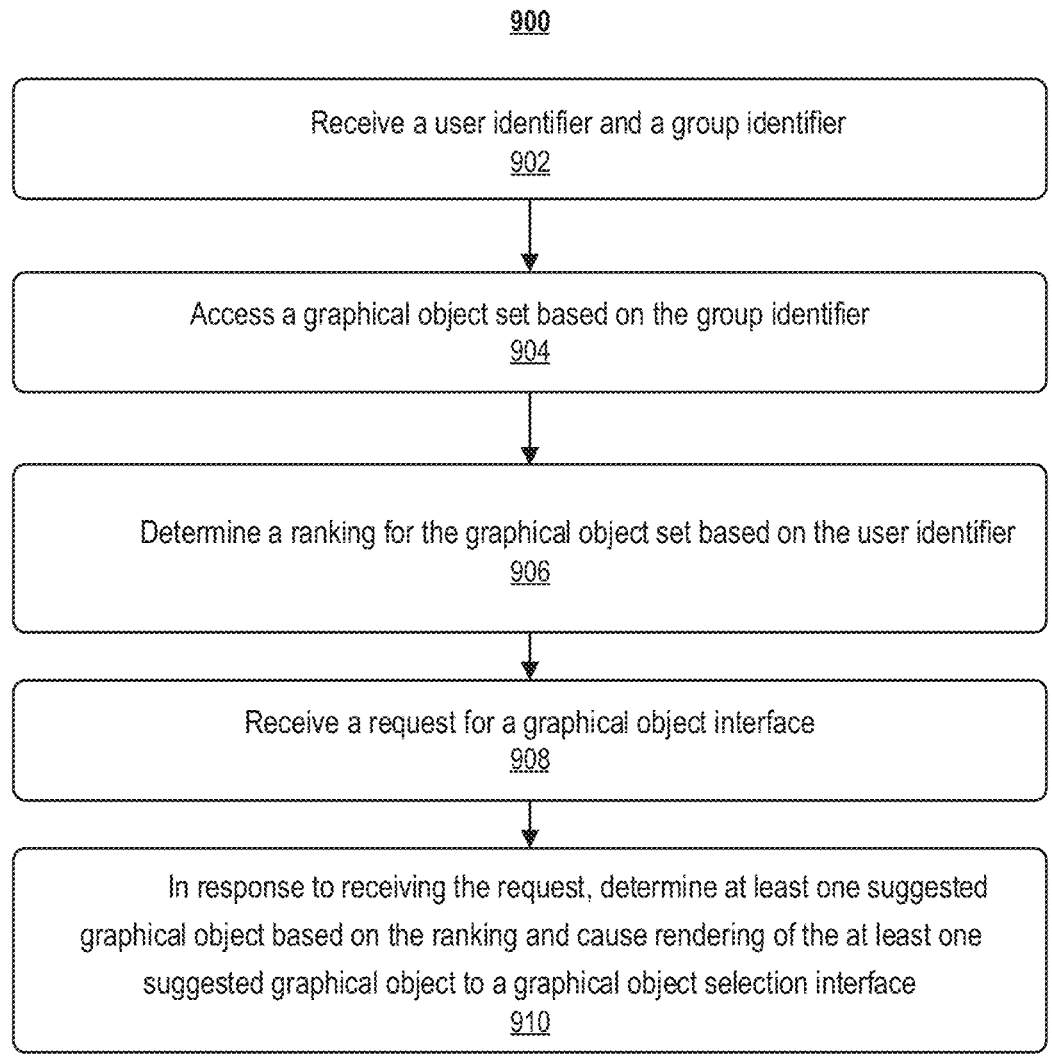
FIG. 9 shows an example process in accordance with one embodiment.

FIG. 9 illustrates an exemplary group-based communication apparatus configured to render suggested graphical objects within a group-based communication platform; the apparatus comprises at least one processor and at least one non-transitory memory including program code. At block 902, the system (e.g., one or more electronic devices), receives a user identifier and a group identifier; at block 904, the system accesses a graphical object set based on the group identifier; at block 906, the system determines a ranking for the graphical object set based on the user identifier; at block 908, the system receives a request for a graphical object interface; at block 910, the system, in response to receiving the request, determines at least one suggested graphical object based on the ranking and causes rendering of the at least one suggested graphical object to a graphical object selection interface.

Figure 10:
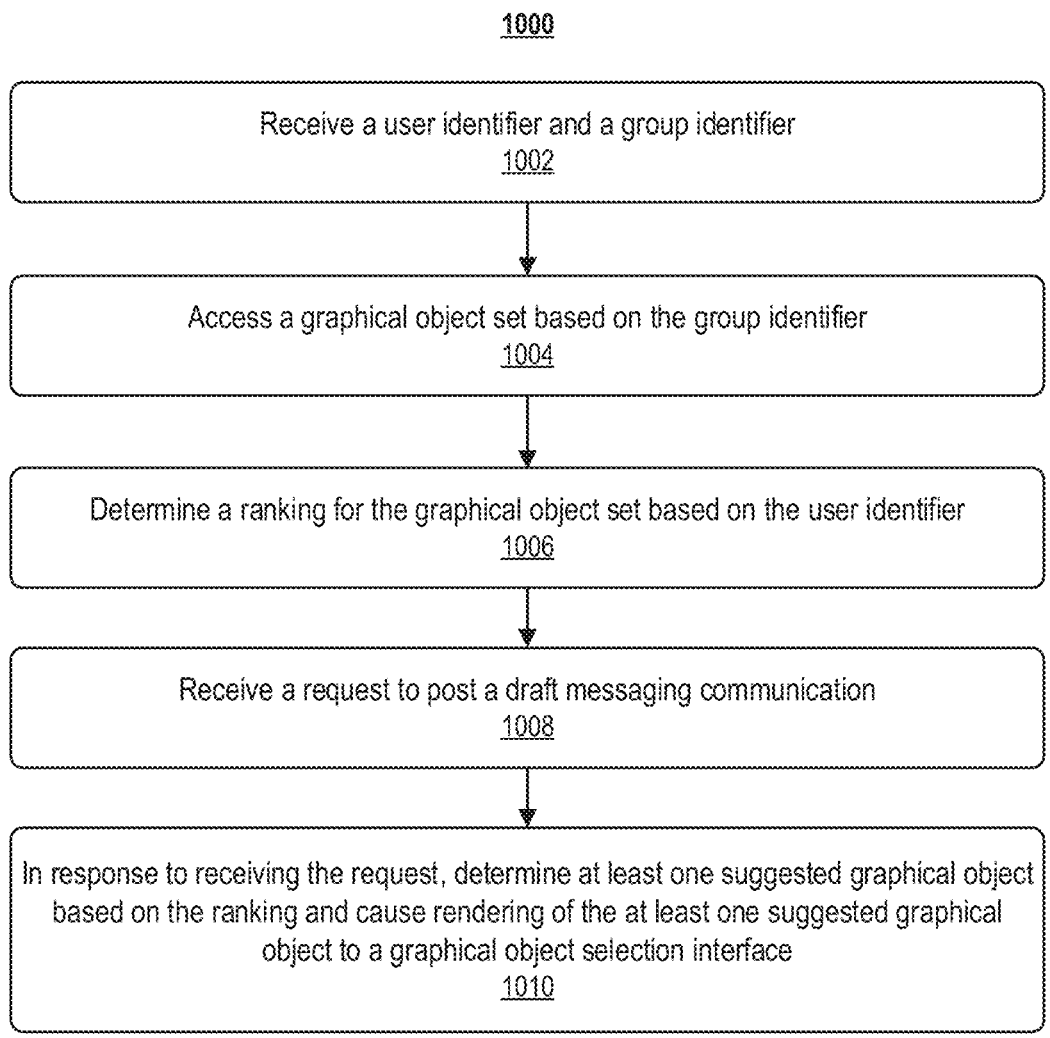
FIG. 10 shows an example process in accordance with one embodiment.

FIG. 10 illustrates an exemplary group-based communication apparatus configured to render suggested graphical objects within a group-based communication platform; the apparatus comprises at least one processor and at least one non-transitory memory including program code. At block 1002, the system (e.g., one or more electronic devices), receives a user identifier and a group identifier; at block 1004, the system accesses a graphical object set based on the group identifier; at block 1006, the system determines a ranking for the graphical object set based on the user identifier; at block 1008, the system receives a request to post a draft messaging communication; at block 1010, the system, in response to receiving the request, determines at least one suggested graphical object based on the ranking and causes rendering of the at least one suggested graphical object to a graphical object selection interface.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus configured to render suggested graphical objects within a group-based communication platform, the apparatus comprising at least one processor and at least one non-transitory memory including program code, the at least one non-transitory memory and the program code configured to, with the at least one processor, cause the apparatus to at least:
   receive a user identifier and a group identifier;
   access a graphical object set comprising a plurality of graphical objects associated with the group identifier in a group-based communication repository, the graphical object set defined for a workspace of the group-based communication platform;
   determine a ranking for the graphical object set based on the user identifier;
   receive a request for a graphical object interface; and
   in response to receiving the request, determine at least one suggested graphical object based on the ranking and cause rendering of the at least one suggested graphical object to a graphical object selection interface.

2. The apparatus of claim 1, wherein the at least one non-transitory memory including the program code is further configured to, with the at least one processor, cause the apparatus to:
   access a messaging communication associated with the request, the messaging communication comprising metadata and content data;
   parse the content data to identify at least one text object;
   update the ranking for the graphical object set based on the metadata and the at least one text object; and
   determine at least one additional suggested graphical object based on the updated ranking and cause rendering of the at least one additional suggested graphical object to the graphical object selection interface.

3. The apparatus of claim 1, wherein the at least one non-transitory memory including the program code is further configured to, with the at least one processor, cause the apparatus to:
   access a messaging communication associated with the request, the messaging communication comprising metadata and content data;
   parse the content data to identify at least one text object, wherein the at least one text object is associated with a second user identifier;
   update the ranking for the graphical object set based on the metadata, the at least one text object, and the second user identifier; and
   determine at least one additional suggested graphical object based on the updated ranking and cause rendering of the at least one additional suggested graphical object to the graphical object selection interface.

4. The apparatus of claim 1, wherein the at least one non-transitory memory including the program code is further configured to, with the at least one processor, cause the apparatus to:
   access a messaging communication associated with the request, the messaging communication comprising metadata and content data;
   parse the content data to identify at least one text object;
   determine one or more graphical objects by comparing the at least one text object to a keyword set of each graphical object of the graphical object set;
   update the ranking for the graphical object set based on the metadata and the determined one or more graphical objects; and
   determine at least one additional suggested graphical object based on the updated ranking and cause rendering of the at least one additional suggested graphical object to the graphical object selection interface.

5. The apparatus of claim 4, wherein the at least one non-transitory memory including the program code is further configured to, with the at least one processor, cause the apparatus to:
   analyze one or more messaging communications comprising a graphical object;
   derive, based on the one or more messaging communications, a keyword; and
   associate the keyword with the keyword set of the graphical object.

6. The apparatus of claim 5, wherein the keyword is derived using one or more machine-learning algorithms.

7. The apparatus of claim 1, wherein the at least one non-transitory memory including the program code configured to cause the apparatus to determine the ranking for the graphical object set is configured to, with the at least one processor, cause the apparatus to:
   determine a plurality of scores for the graphical object set, wherein a score of the plurality of scores is based on at least one of a user frequency score or a user preference associated with a respective graphical object of the graphical object set.

8. The apparatus of claim 1, wherein the at least one non-transitory memory including the program code is further configured to, with the at least one processor, cause the apparatus to:
   access a role identifier associated with the user identifier, wherein determining the ranking for the graphical object set is further based on the role identifier.

9. A computer-implemented method for rendering suggested graphical objects within a group-based communication interface of a group-based communication platform, the computer-implemented method comprising:
   receiving a user identifier and a group identifier;
   accessing a graphical object set comprising a plurality of graphical objects associated with the group identifier in a group-based communication repository, the graphical object set defined for a workspace of the group-based communication platform;
   determining a ranking for the graphical object set based on the user identifier;
   receiving a request for a graphical object interface; and
   in response to receiving the request, determining at least one suggested graphical object based on the ranking and causing rendering of the at least one suggested graphical object to a graphical object selection interface.

10. The computer-implemented method of claim 9, further comprising:
   accessing a messaging communication associated with the request, the messaging communication comprising metadata and content data;
   parsing the content data to identify at least one text object;

updating the ranking for the graphical object set based on the metadata and the at least one text object; and determining at least one additional suggested graphical object based on the updated ranking and causing rendering of the at least one additional suggested graphical object to the graphical object selection interface.

11. The computer-implemented method of claim 9, further comprising:

accessing a messaging communication associated with the request, the messaging communication comprising metadata and content data;

parsing the content data to identify at least one text object;

determining one or more graphical objects by comparing the at least one text object to a keyword set of each graphical object of the graphical object set;

updating the ranking for the graphical object set based on the metadata and the determined one or more graphical objects; and determining at least one additional suggested graphical object based on the updated ranking and causing rendering of the at least one additional suggested graphical object to the graphical object selection interface.

12. The computer-implemented method of claim 9, wherein determining the ranking for the graphical object set comprises:

determining a plurality of scores for the graphical object set, wherein a score of the plurality of scores is based on at least one of a user frequency score or a user preference associated with a respective graphical object of the graphical object set.

13. The computer-implemented method of claim 9, further comprising:

accessing a role identifier associated with the user identifier, wherein determining the ranking for the graphical object set is further based on the role identifier.

14. The computer-implemented method of claim 11, further comprising:

analyze one or more messaging communications comprising a graphical object;

derive, based on the one or more messaging communications, a keyword; and associate the keyword with the keyword set of the graphical object.

15. The computer-implemented method of claim 14, wherein the keyword is derived using one or more machine-learning algorithms.

16. A computer program product comprising at least one non-transitory computer-readable storage medium having computer-readable program code portions stored therein, the computer-readable program code portions comprising an executable portion configured to:

receive a user identifier and a group identifier;

access a graphical object set comprising a plurality of graphical objects associated with the group identifier in a group-based communication repository, the graphical object set defined for a workspace of a group-based communication platform;

determine a ranking for the graphical object set based on the user identifier;

receive a request for a graphical object interface; and in response to receiving the request, determine at least one suggested graphical object based on the ranking and cause rendering of the at least one suggested graphical object to a graphical object selection interface.

17. The computer program product of claim 16, wherein the computer-readable program code portions comprising the executable portion are configured to further:

access a messaging communication associated with the request, the messaging communication comprising metadata and content data;

parse the content data to identify at least one text object;

update the ranking for the graphical object set based on the metadata and the at least one text object; and determine at least one additional suggested graphical object based on the updated ranking and cause rendering of the at least one additional suggested graphical object to the graphical object selection interface.

18. The computer program product of claim 16, wherein the computer-readable program code portions comprising the executable portion are configured to further:

access a messaging communication associated with the request, the messaging communication comprising metadata and content data;

parse the content data to identify at least one text object;

determine one or more graphical objects by comparing the at least one text object to a keyword set of each graphical object of the graphical object set;

update the ranking for the graphical object set based on the metadata and the determined one or more graphical objects; and determine at least one additional suggested graphical object based on the updated ranking and cause rendering of the at least one additional suggested graphical object to the graphical object selection interface.

19. The computer program product of claim 16, wherein the computer-readable program code portions comprising the executable portion configured to determine the ranking for the graphical object set are configured to:

determine a plurality of scores for the graphical object set, wherein a score of the plurality of scores is based on at least one of a user frequency score or a user preference associated with a respective graphical object of the graphical object set.

20. The computer program product of claim 16, wherein the computer-readable program code portions comprising the executable portion are configured to further:

access a role identifier associated with the user identifier, wherein determining the ranking for the graphical object set is further based on the role identifier.

* * * * *